(12) United States Patent
Akeley et al.

(10) Patent No.: US 8,908,058 B2
(45) Date of Patent: Dec. 9, 2014

(54) STORAGE AND TRANSMISSION OF PICTURES INCLUDING MULTIPLE FRAMES

(75) Inventors: Kurt Barton Akeley, Saratoga, CA (US); Yi-Ren Ng, Redwood City, CA (US); Kenneth Wayne Waters, San Jose, CA (US); Kayvon Fatahalian, San Francisco, CA (US); Timothy James Knight, Palo Alto, CA (US); Yuriy Aleksandrovich Romanenko, Campbell, CA (US)

(73) Assignee: Lytro, Inc., Mountain View, CA (US)

( * ) Notice: Subject to any disclaimer, the term of this patent is extended or adjusted under 35 U.S.C. 154(b) by 531 days.

(21) Appl. No.: 13/155,882

(22) Filed: Jun. 8, 2011

(65) Prior Publication Data

US 2011/0234841 A1 Sep. 29, 2011

Related U.S. Application Data

(63) Continuation-in-part of application No. 12/703,367, filed on Feb. 10, 2010, now abandoned.

(60) Provisional application No. 61/170,620, filed on Apr. 18, 2009.

(51) Int. Cl.
*H04N 5/228* (2006.01)
*H04N 5/232* (2006.01)
*H04N 9/82* (2006.01)
*H04N 5/77* (2006.01)

(52) U.S. Cl.
CPC ............ *H04N 5/232* (2013.01); *H04N 9/8205* (2013.01); *H04N 5/772* (2013.01)
USPC .................... 348/222.1; 348/231.99; 348/345

(58) Field of Classification Search
USPC .................................. 348/222.1, 231.99, 345
See application file for complete search history.

(56) References Cited

U.S. PATENT DOCUMENTS

| 725,567 A | 4/1903 | Ives |
| 4,383,170 A | 5/1983 | Takagi et al. |

(Continued)

FOREIGN PATENT DOCUMENTS

| DE | 19624421 | 6/1996 |
| WO | 03052465 | 6/2003 |

(Continued)

OTHER PUBLICATIONS

Adelson et al., "Single Lens Stereo with a Plenoptic Camera" IEEE Translation on Pattern Analysis and Machine Intelligence, Feb. 1992. vol. 14, No. 2, pp. 99-106.

(Continued)

*Primary Examiner* — Nicholas Giles
*Assistant Examiner* — Abdelaaziz Tissire
(74) *Attorney, Agent, or Firm* — Raubvogel Law Office

(57) ABSTRACT

According to various embodiments, multiple frames, each having image data and metadata, can be aggregated into pictures. The frames may come from different image capture devices, enabling aggregation of image data from multiple sources. Aggregation can be automatic, or it can be performed in response to user input specifying particular combinations of frames to be aggregated. In various embodiments, pictures are mutable, whereas immutability of the constituent frames is enforced. In various embodiments, certain metadata elements that are not essential to rendering can be selectively removed from frames, so as to address privacy concerns. In various embodiments, frames can be authenticated by the use of digests generated by a hash function.

28 Claims, 15 Drawing Sheets

(56) References Cited

U.S. PATENT DOCUMENTS

| | | | |
|---|---|---|---|
| 4,661,986 A | | 4/1987 | Adelson |
| 4,694,185 A | | 9/1987 | Weiss |
| 4,920,419 A | | 4/1990 | Easterly |
| 5,076,687 A | | 12/1991 | Adelson |
| 5,282,045 A | | 1/1994 | Mimura et al. |
| 5,610,390 A | | 3/1997 | Miyano |
| 5,748,371 A | | 5/1998 | Cathey, Jr. et al. |
| 5,757,423 A | | 5/1998 | Tanaka et al. |
| 5,907,619 A | * | 5/1999 | Davis ............................ 713/176 |
| 5,949,433 A | | 9/1999 | Klotz |
| 6,005,936 A | * | 12/1999 | Shimizu et al. ............... 713/176 |
| 6,023,523 A | | 2/2000 | Cohen et al. |
| 6,028,606 A | | 2/2000 | Kolb et al. |
| 6,097,394 A | | 8/2000 | Levoy et al. |
| 6,201,899 B1 | | 3/2001 | Bergen |
| 6,320,979 B1 | | 11/2001 | Melen |
| 6,483,535 B1 | | 11/2002 | Tamburrino et al. |
| 6,577,342 B1 | | 6/2003 | Wester |
| 6,597,859 B1 | | 7/2003 | Leinhardt et al. |
| 6,833,865 B1 | * | 12/2004 | Fuller et al. ................. 348/231.2 |
| 6,842,297 B2 | | 1/2005 | Dowski, Jr. |
| 6,900,841 B1 | | 5/2005 | Mihara |
| 6,927,922 B2 | | 8/2005 | George et al. |
| 7,034,866 B1 | | 4/2006 | Colmenarez et al. |
| 7,336,430 B2 | | 2/2008 | George et al. |
| 7,620,309 B2 | | 11/2009 | Georgiev |
| 7,623,726 B1 | | 11/2009 | Georgiev |
| 7,748,022 B1 | * | 6/2010 | Frazier .......................... 725/105 |
| 7,949,252 B1 | | 5/2011 | Georgiev |
| 8,155,478 B2 | | 4/2012 | Vitsnudel et al. |
| 2002/0001395 A1 | * | 1/2002 | Davis et al. ................... 382/100 |
| 2002/0159030 A1 | | 10/2002 | Frey et al. |
| 2002/0199106 A1 | * | 12/2002 | Hayashi ........................ 713/176 |
| 2003/0081145 A1 | * | 5/2003 | Seaman et al. ................ 348/460 |
| 2003/0103670 A1 | | 6/2003 | Schoelkopf et al. |
| 2003/0117511 A1 | | 6/2003 | Belz et al. |
| 2003/0123700 A1 | * | 7/2003 | Wakao .......................... 382/100 |
| 2003/0156077 A1 | | 8/2003 | Balogh |
| 2004/0114176 A1 | | 6/2004 | Bodin et al. |
| 2004/0257360 A1 | | 12/2004 | Sieckmann |
| 2005/0052543 A1 | * | 3/2005 | Li et al. ...................... 348/222.1 |
| 2005/0080602 A1 | | 4/2005 | Snyder et al. |
| 2006/0130017 A1 | * | 6/2006 | Cohen et al. .................. 717/136 |
| 2006/0248348 A1 | * | 11/2006 | Wakao et al. ................. 713/186 |
| 2007/0030357 A1 | * | 2/2007 | Levien et al. ............ 348/211.14 |
| 2007/0071316 A1 | | 3/2007 | Kubo |
| 2007/0188613 A1 | | 8/2007 | Nobori et al. |
| 2007/0230944 A1 | | 10/2007 | Georgiev |
| 2007/0252074 A1 | | 11/2007 | Ng et al. |
| 2008/0007626 A1 | | 1/2008 | Wernersson |
| 2008/0012988 A1 | * | 1/2008 | Baharav et al. ............... 348/586 |
| 2008/0018668 A1 | | 1/2008 | Yamauchi |
| 2008/0049113 A1 | * | 2/2008 | Hirai ........................... 348/222.1 |
| 2008/0131019 A1 | * | 6/2008 | Ng ................................ 382/255 |
| 2008/0152215 A1 | | 6/2008 | Horie et al. |
| 2008/0180792 A1 | | 7/2008 | Georgiev |
| 2008/0187305 A1 | | 8/2008 | Raskar et al. |
| 2008/0193026 A1 | | 8/2008 | Horie et al. |
| 2008/0226274 A1 | | 9/2008 | Spielberg |
| 2008/0266655 A1 | | 10/2008 | Levoy et al. |
| 2008/0309813 A1 | | 12/2008 | Watanabe |
| 2009/0027542 A1 | | 1/2009 | Yamamoto et al. |
| 2009/0041381 A1 | | 2/2009 | Georgiev et al. |
| 2009/0041448 A1 | | 2/2009 | Georgiev et al. |
| 2009/0102956 A1 | | 4/2009 | Georgiev |
| 2009/0128658 A1 | | 5/2009 | Hayasaka et al. |
| 2009/0128669 A1 | | 5/2009 | Ng et al. |
| 2009/0140131 A1 | | 6/2009 | Utagawa |
| 2009/0185051 A1 | * | 7/2009 | Sano .......................... 348/231.2 |
| 2009/0185801 A1 | | 7/2009 | Georgiev et al. |
| 2009/0204813 A1 | * | 8/2009 | Kwan ........................... 713/161 |
| 2009/0268970 A1 | | 10/2009 | Babacan |
| 2009/0273843 A1 | | 11/2009 | Raskar et al. |
| 2009/0295829 A1 | | 12/2009 | Georgiev et al. |
| 2010/0021001 A1 | * | 1/2010 | Honsinger et al. ............ 382/100 |
| 2010/0026852 A1 | | 2/2010 | Ng et al. |
| 2010/0097444 A1 | | 4/2010 | Lablans |
| 2010/0111489 A1 | * | 5/2010 | Presler ............................ 386/52 |
| 2010/0129048 A1 | | 5/2010 | Pitts et al. |
| 2010/0141802 A1 | | 6/2010 | Knight et al. |
| 2010/0303288 A1 | * | 12/2010 | Malone ......................... 382/100 |
| 2011/0050909 A1 | * | 3/2011 | Ellenby et al. .............. 348/207.1 |
| 2011/0129120 A1 | * | 6/2011 | Chan ............................. 382/103 |
| 2011/0129165 A1 | | 6/2011 | Lim et al. |
| 2011/0311046 A1 | * | 12/2011 | Oka .............................. 380/243 |
| 2012/0249550 A1 | * | 10/2012 | Akeley et al. ................. 345/419 |
| 2012/0327222 A1 | | 12/2012 | Ng et al. |
| 2013/0088616 A1 | * | 4/2013 | Ingrassia, Jr. ............... 348/231.5 |
| 2013/0113981 A1 | | 5/2013 | Knight et al. |

FOREIGN PATENT DOCUMENTS

| | | |
|---|---|---|
| WO | 2006039486 | 4/2006 |
| WO | 2007092545 | 8/2007 |
| WO | 2007092581 | 8/2007 |

OTHER PUBLICATIONS

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modern method of achieving high performance and/or low cost imaging systems" SPIE Proceedings, vol. 3779.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Ives, H., "Optical properties of a Lippman lenticulated sheet," J. Opt. Soc. Am. 21, 171 (1931).

Jackson et al., "Selection of a Convolution Function for Fourier Inversion Using Gridding" IEEE Transactions on Medical Imaging, Sep. 1991, vol. 10, No. 3, pp. 473-478.

Levoy, M., et al., "Light Field Microscopy," ACM Transactions on Graphics, vol. 25, No. 3, Proceedings SIGGRAPH 2006.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Lippmann, "Reversible Prints", Communication at the French Society of Physics, Journal of Physics, 7 , 4, Mar. 1908, pp. 821-825.

Lumsdaine et al., "Full Resolution Lightfield Rendering" Adobe Technical Report Jan. 2008, pp. 1-12.

Naemura et al., "3-D Computer Graphics based on Integral Photography" Optics Express, Feb. 12, 2001. vol. 8, No. 2, pp. 255-262.

Ng, R., et al. "Light Field Photography with a Hand-Held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Okano et al., "Three-dimensional video system based on integral photography" Optical Engineering, Jun. 1999. vol. 38, No. 6, pp. 1072-1077.

Sokolov, "Autostereoscopy and Integral Photography by Professor Lippmann's Method" , 1911, pp. 23-29.

Tanida et al., "Thin observation module by bound optics (TOMBO): concept and experimental verification"Applied Optics 40, 11 (April), pp. 1806-1813.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

(56) References Cited

OTHER PUBLICATIONS

Vaish et al., "Using plane+parallax for calibrating dense camera arrays", in Proceedings CVPR 2004, pp. 2-9.
Wilburn et al., "High Performance Imaging Using Large Camera Arrays", ACM Transactions on Graphics (TOG), vol. 24, Issue 3 (Jul. 2005), Proceedings of ACM SIGGRAPH 2005, pp. 765-776.
Fitzpatrick, Brad, "Camlistore", Feb. 1, 2011, pp. 1-27. Retrieved from http://camlistore.org/.
Adobe Systems Incorporated, "XMP Specification", pp. 1-112, Sep. 2005.
Adelson, E. H., and Bergen, J. R. 1991. The plenoptic function and the elements of early vision. In Computational Models of Visual Processing, edited by Michael S. Lady and J. Anthony Movshon. Cambridge, Mass.: mit Press.
Adobe, "Photoshop CS6 / in depth: Digital Negative (DNG)", http://www.adobe.com/products/photoshop/extend.displayTab2html. Retrieved Jan. 2013.
Fitzpatrick, Brad, "Camlistore", Feb. 1, 2011.
Georgiev, T., et al., Plenoptic Camera 2.0 (2008).
Georgiev, T., et al., "Unified Frequency Domain Analysis of Lightfield Cameras" (2008).
Mallat, Stephane, "A Wavelet Tour of Signal Processing", Academic Press 1998.
Nakamura, J., "Image Sensors and Signal Processing for Digital Still Cameras" (Optical Science and Engineering), 2005.
Ogden, J., "Pyramid-Based Computer Graphics", 1985.
Story, D., "The Future of Photography", Optics Electronics, Oct. 2008.
Portable Network Graphics format: http://en.wikipedia.org/wiki/Portable_Network_Graphics. Retrieved Jan. 2013.
Exchangeable image file format: http://en.wikipedia.org/wiki/Exchangeable_image_file_format. Retrieved Jan. 2013.
Extensible Metadata Platform: http://en.wikipedia.org/wiki/Extensible_Metadata_Platform. Retrieved Jan. 2013.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
Data overlay techniques for real-time visual feed. For example, heads-up displays (http://en.wikipedia.org/wiki/Head-up_display). Retrieved Jan. 2013.
Autofocus systems and methods (http://en.wikipedia.org/wiki/Autofocus). Retrieved Jan. 2013.
Williams, L., "Pyramidal Parametrics", Computer Graphics (1983).

\* cited by examiner

STORAGE AND TRANSMISSION OF PICTURES INCLUDING MULTIPLE FRAMES

CROSS-REFERENCE TO RELATED APPLICATIONS

The present application claims priority as a continuation-in-part of U.S. Utility application Ser. No. 12/703,367 for "Light Field Camera Image, File and Configuration Data, and Method of Using, Storing and Communicating Same," filed Feb. 10, 2010, now abandoned the disclosure of which is incorporated herein by reference. U.S. Utility application Ser. No. 12/703,367 claimed priority from U.S. Provisional Application Ser. No. 61/170,620 for "Light Field Camera Image, File and Configuration Data, and Method of Using, Storing and Communicating Same," filed Apr. 18, 2009, the disclosure of which is incorporated herein by reference.

FIELD OF THE INVENTION

The present invention relates to storage, manipulation, and/or transmission of image data and related data.

BACKGROUND

Light field photography captures information about the direction of light as it arrives at a sensor within a data acquisition device such as a light field camera. Such light field data can be used, along with captured image data, to create representations of scenes that can be manipulated by a user. Subsequent to image capture, light field processing can be used to generate images using the captured image data along with the light field data. Various types of light field processing can be performed, including for example refocusing, aberration correction, changing the viewing perspective, and the like. These and other techniques are described in the related U.S. Utility Application referenced above.

Conventionally, images may be represented as digital data that can be stored electronically. Many such image formats are known in the art, such as for example JPG, EXIF, BMP, PNG, PDF, TIFF and/or HD Photo data formats. Such image formats can be used for storing, manipulating, displaying, and/or transmitting image data.

It is well known that such image data can be edited. Many software applications exist for editing digital images, such as for example Photoshop available from Adobe, Inc. of San Jose, Calif. Generally, such software applications make changes to image data directly, so that editing causes the original form of the image data to be lost.

It is also well known to provide the ability to share images, for example via a website, social networking site, email architecture, or the like. Generally, sharing of images requires that image data be transmitted and/or stored in multiple locations; these operations can consume bandwidth and can be inefficient when similar data is repeatedly transmitted and/or stored. Furthermore, repeated transmission, storage, and modification of image data can lead to concerns about privacy and authenticity.

SUMMARY

According to various embodiments of the invention, a system and method are provided for storing, manipulating, and/or transmitting image data, such as light field photographs and the like, in a unified manner that preserves relationships among constituent data elements, enforces immutability of source images, reduces bandwidth and storage requirements, and addresses privacy concerns. The system and method of the present invention also enable deferred combination of images captured from multiple sources and/or at different times.

According to various embodiments of the invention, a container file representing a scene (referred to herein as a "picture" or "picture file") can include or be associated with any number of component image elements (referred to herein as "frames"). Frames may come from different image capture devices, enabling aggregation of image data from multiple sources. Frames can include image data as well as additional data describing the scene, its particular characteristics, image capture equipment, and/or the conditions under which the frames were captured. Such additional data are referred to herein as metadata, which may be universal or application-specific. Metadata may include, for example, tags, edit lists, and/or any other information that may affect the way images derived from the picture look. Metadata may further include any other state information that is or may be associated with a frame or picture and is visible to an application. Picture files may also include instructions for combining frames and performing other operations on frames when rendering a final image.

In one embodiment, frames and pictures are implemented as data structures that can be manipulated by software running on a digital camera, computing device, or other electronic device. Frames and/or pictures can be stored on any suitable electronic storage device, using a suitable file format, and can be transmitted among electronic devices using any suitable protocol and/or network communication scheme.

Using the data structures and other characteristics defined herein, pictures having any number of frames can be stored, manipulated and/or transmitted. Each frame can represent an image captured by a sensor in a digital camera, along with appropriate state information. Each image can be a light field image or a conventional two-dimensional image. A frame having a two-dimensional image is referred to as a two-dimensional frame; a frame having a light field image is referred to as a light field frame. Pictures can include two-dimensional frames, light field frames, or any combination thereof. A picture can also be reduced to, or converted to, any standard image format as desired.

In one embodiment, each frame includes data representing an image detected by the sensor of the camera (image data), and may also include data describing other relevant camera parameters (metadata). Examples of metadata include camera settings such as zoom and exposure time, the geometry of a microlens array used in capturing a light field frame, and the like. The metadata may be provided in text format, XML, and/or in any other suitable format. The image data contained in each frame may be provided in any suitable format, such as for example a raw image or a lossy compression of the raw image. If the image is a raw image, the frame is referred to as a raw frame.

In one embodiment, pictures can contain any number of frames, and can also contain additional metadata, if appropriate. In addition to one or more frames and/or metadata, pictures can also include data derived from the frames and metadata.

In some embodiments, constituent frames of a picture may have been captured at different times and even by different data acquisition devices. For example, several cameras can be used for capturing images to be aggregated into a picture. In such a scenario, each individual camera may not possess the complete picture, as each is contributing only a subset of the frames for the picture. According to one embodiment, the present invention enables deferred aggregation, wherein cameras are able to output pictures (either 2-D or light field), and their various components (such as frames), even if additional frames and/or data is/are expected at a later time. Additional frames and/or data can be aggregated with such pictures at a later time, either by the camera itself or by software running at a computing device.

In one embodiment, the system of the present invention provides mechanisms for ensuring that original frame data is preserved, even when users and/or other entities make changes to pictures. Specifically, in one embodiment, the system of the present invention allows editing of pictures (aggregations of frames, as well as other data), without allowing changes to the original frames themselves. Thus, frames are treated as immutable, so that any editing or changes made to images are made to pictures rather than their constituent frames. More particularly, special effects, distortions, color effects, refocusing, and/or other operations that can be performed on images are stored as instructions within the picture data structure, and are applied when rendering the final image, so that the original image data is not overwritten. Thus, the instructions specified within a picture are mutable, even though the included frames remain immutable.

In one embodiment, the immutability of frames is enforced by the use of a digest, or hash, which is a unique identifier that may be recomputed (invariantly) from the frame's contents at any time. Unauthorized changes to a frame can thus be detected by comparing the frame's digest with a previously computed digest for that frame. In one embodiment, each picture file can include a digest for each frame, even when the frame itself is included in the picture, so that any unauthorized changes to frame data can be detected by performing a new hash operation on the frame data and comparing the digest with the result of the hash operation.

In one embodiment, the system of the present invention includes mechanisms for displaying a final image at an output device, based on stored picture data. The picture data may include any number of frames, as well as descriptions of operations that are to be performed on the frames. In one embodiment, aggregation and other operations are performed "on the fly" when an image is to be rendered for display or transmission. In another embodiment, a picture can be reduced or converted into an image file having conventional image data format; this image file can then be displayed, rendered, or transmitted by conventional means.

The present invention also provides a mechanism for improving the efficiency of image sharing. For example, when changes are made to a picture whose frames are already stored at two or more locations, only the changes need be transmitted from one location to another. Each location can use its existing copy of the frame data, without the need for transmitting such frame data from one location to another. Only the changes in operations to be performed on the frame data need be transmitted. The present invention thus avoids the needless and redundant transmission of frame data.

Accordingly, in various embodiments, the system of the present invention provides a mechanism by which multiple frames can be aggregated into pictures. This simplifies the process by which users can manage, view, and manipulate multiple images that have some logical relation to one another. Multi-frame pictures can also be reliably aggregated, with assurances of image integrity, even long after the individual images are captured. Such aggregation can be automatic, or it can be performed in response to user input specifying particular combinations of frames to be aggregated.

In addition, the system of the present invention provides a mechanism for allowing a picture to be modified, while enforcing the immutability of the constituent frames.

The present invention also provides additional advantages, as will be made apparent in the description provided herein. In one embodiment, certain metadata elements that are not essential to rendering can be selectively removed from frames. For example, in circumstances where an originator of an image wishes to remain anonymous, metadata elements that may identify of the originator can be obscured or deleted using the techniques of the present invention.

One skilled in the art will recognize that the technique for storing, manipulating, and transmitting light field picture describing described herein can be applied to other scenarios and conditions, and is not limited to the specific examples discussed herein. For example, the system of the present invention is not limited to light field pictures, but can also be applied to pictures taken by conventional cameras and other imaging devices, whether or not such pictures contain light field data.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Terminology

Figure 1A:
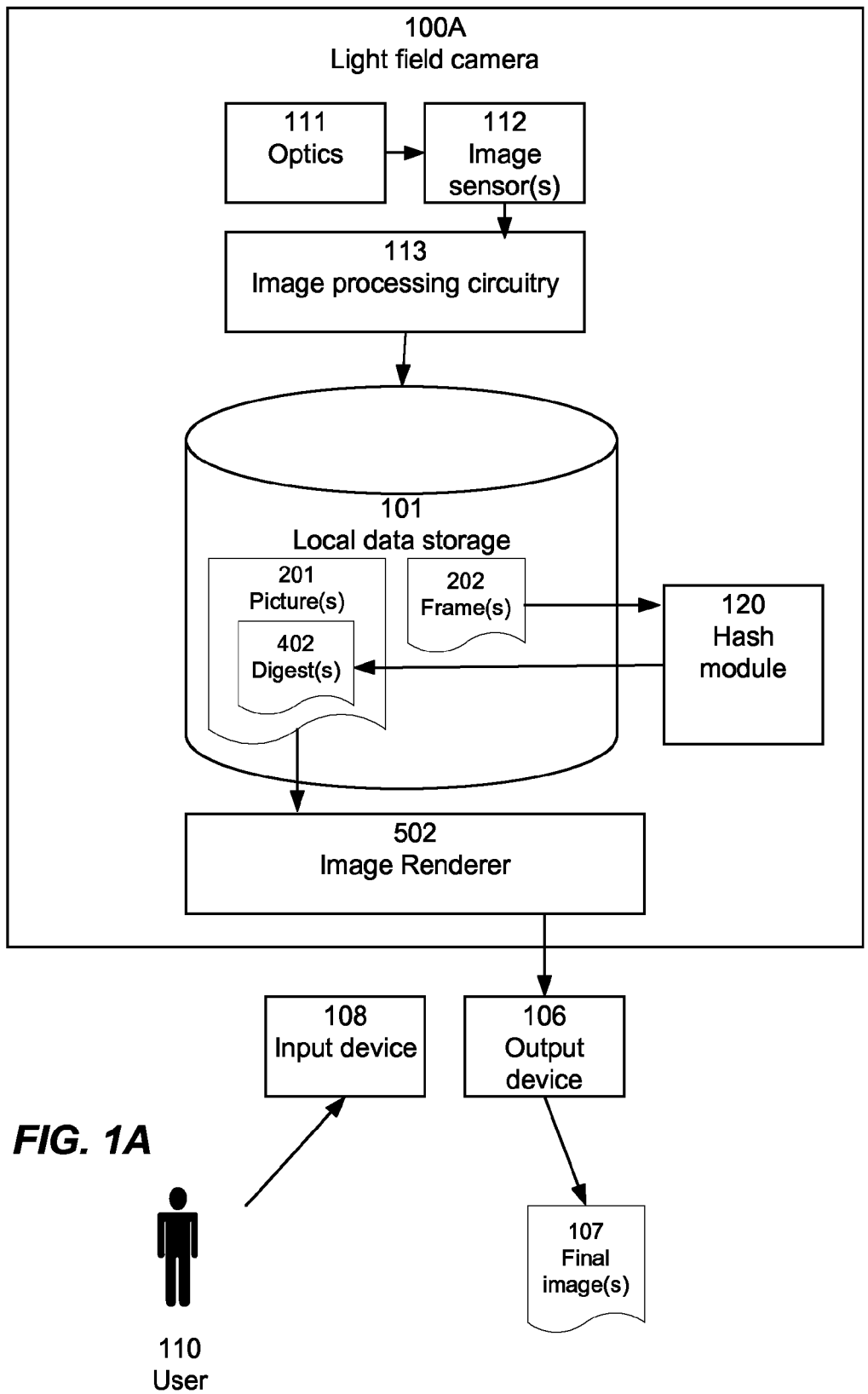
FIG. 1A depicts an architecture for implementing the present invention in a camera, according to one embodiment.

The following terms are defined for purposes of the description provided herein:

Capture event: the capture of a set of frames that are related. An example of a capture event on a single camera is sequential-flash relighting. Capture events can also involve multiple cameras, each capturing one or more frames.

Frame: a data entity (stored, for example, in a file) containing a description of the state corresponding to a single captured sensor exposure in a camera. This state includes the sensor image, and other relevant camera parameters, specified as metadata. The sensor image may be either a raw image or a compressed representation of the raw image.

Digest: a result of a hash function applied to a frame. In one embodiment, each digest is a 2-tuple: a first entry identifies a hash function, and a second entry provides the result of the identified hash function applied to a frame. As described below, digests provide a mechanism for authenticating frames.

Framed picture: a picture that includes frame data for all of its frames. (No frame in a framed picture is represented by its digest.)

Immutable: in one embodiment, the term "immutable" is used herein to refer to data that is not easily changeable by an ordinary user of the device without such a change being detected. It is possible, however, that a system administrator or other authorized individual may be able to make changes to such data, under certain circumstances.

Light field: a collection of rays. A ray's direction specifies a path taken by light, and its color specifies the radiance of light following that path.

Light field frame: a frame whose sensor image is a light field image.

Light field image: a two-dimensional image that spatially encodes a four-dimensional light field. The sensor image from a light field camera is a light field image.

Light field picture: a picture with one or more light field frames. (A picture with a mix of two-dimensional and light field frames is a light field picture.)

Microlens: a small lens.

Picture: a data entity (stored, for example, in a file) containing one or more frames, metadata, and/or data derived from the frames and/or metadata. Metadata can include tags, edit lists, and/or any other descriptive information or state associated with a picture or frame.

Pixel: an n-tuple of intensity values, with an implied meaning for each value. A typical 3-tuple pixel format is RGB, wherein the first value is red intensity, the second green intensity, and the third blue intensity. Also refers to an individual sensor element for capturing data for a pixel.

Raw image: an image (for example in Bayer format) that has not been subjected to any lossy compression since it was captured at a sensor.

Raw frame: a frame in which the sensor image is a raw image.

Sensor image: any representation of a raw image.

Two dimensional (2-D) frames: a frame whose sensor image is a two-dimensional (2-D) image.

Two dimensional (2-D) image (or image): a two-dimensional (2-D) array of pixels. The pixels are typically arranged in a square or rectangular Cartesian pattern, but other patterns are possible.

Two dimensional (2-D) picture: a picture that includes only 2-D frames.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable data acquisition device.

System Architecture

Referring now to FIG. 1A, there is shown an architecture for implementing the present invention in a light field camera 100A according to one embodiment, although one skilled in the art will recognize that a 2-D camera can also be used. Camera 100A includes optics 111 (such as one or more lenses) for receiving and focusing an image; image sensor(s) 112, located in the optical image path for capturing the image as electronic data; and image processing circuitry 113 for processing the image data to generate data file(s) representing picture(s) 201 and/or frame(s) 202. In the embodiment of FIG. 1A, picture(s) 201 and/or frame(s) 202 are stored in local data storage 101 at camera 100A; however, in other embodiments, such data can be transmitted, output, and/or stored elsewhere. Data storage 101 may be implemented as any magnetic, optical, and/or electrical storage device for storage of data in digital form, such as flash memory, magnetic hard drive, CD-ROM, and/or the like.

In one embodiment, optics 111, image sensor(s) 112, and/or image processing circuitry 113 operate as described in related U.S. Utility application Ser. No. 12/703,367 for "Light Field Camera Image, File and Configuration Data, and Method of Using, Storing and Communicating Same."

Input device 108 receives input from user 110; such input may include commands for editing, deleting, transmitting, combining, and/or otherwise manipulating pictures(s) 201 and/or frame(s) 202. As described in more detail below, in one embodiment the system of the present invention does not permit user 110 to modify individual frames 202, but does allow user 110 to modify pictures 201, so as to allow image editing while preserving the immutability of component frames 202. In general, input device 108 can receive input provided via physical buttons, touchscreen, rocker switch, dial, knob, graphical user interface, or any other suitable mechanism, or any combination thereof. In one embodiment, user 110 operations on pictures 201 are stored as instructions, as described in more detail.

Image renderer 502 renders final image(s) 107 from picture(s) 201 and/or frame(s) 202, using instructions based on user input. Such rendering can be immediate or deferred. Output device 106 present final image(s) 107 to user 110. Output device 106 may be an integrated display screen on camera 100A, a separate display screen (not shown), and/or any other suitable device. Final image(s) 107 may include a representation of picture(s) 201.

In one embodiment, in response to commands presented by user 110 via input device 108, camera 100A combines any number of frames 202 to generate one or more picture(s) 201, according to the techniques described herein. In one embodiment, such combination is performed by generating instructions specifying various types of operations to be performed on frames 202, including for example combining frames 202 with one another.

In one embodiment, both frames 202 and pictures 201 are implemented as container files. As described below, such instructions can be stored for later application by image renderer 502, thus providing a mechanism for deferred aggregation.

Frames 202 may represent image data and metadata captured by camera 100A and/or by other data acquisition devices. Frames 202 may represent image data captured during a single capture event, or they may represent image data captured at different capture events. In this manner, the system of the present invention provides a mechanism for taking data representing multiple images taken at (potentially) multiple points in time at (potentially) multiple cameras or other devices, performing any desired operations on the data (for example to transform images), and/or combining the data into a picture 201 that is viewable by user 110.

In some embodiments, camera 100A may include components (not shown) for transmitting picture(s) 201, frame(s) 202, and/or final image(s) 107 in any suitable data format and according to any suitable data transmission protocol. For example, such data can be transmitted via the Internet, or via a wired or wireless communications network, personal area network such as BlueTooth, cellular telephone network, pager network, or the like. For illustrative purposes, however, FIG. 1A depicts an architecture for implementing the present invention in a stand-alone arrangement, without reference to other components.

In one embodiment, hash module 120 may transform frame(s) 202 into digest(s) 402 by applying a hash function, according to techniques described herein. Such transformation can save storage space and bandwidth in transmitting image data from one component to another, and can provide an authentication mechanism as described herein. Hash module 120 may be used for authenticating previously generated digest(s) 402 by comparing hash results with previously stored digest(s) 402. In various embodiments, hash module 120 may be implemented as software running on a processor, or as a part of image renderer 502, or as a separate component, or in any other suitable fashion. In other embodiments, hash module 120 may be omitted.

Figure 1B:
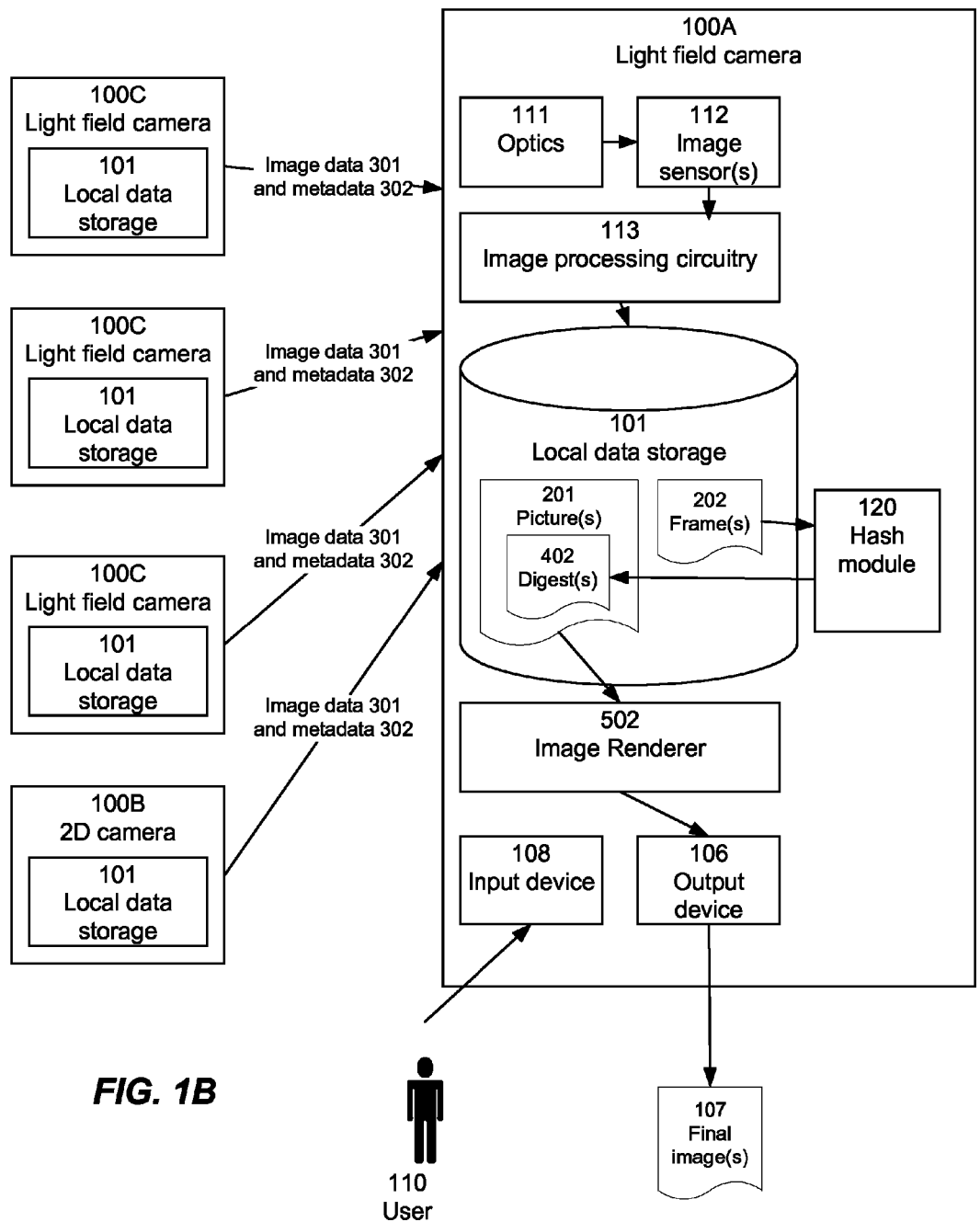
FIG. 1B depicts an architecture for implementing the present invention wherein a camera collects image data from other cameras, according to one embodiment.

Referring now to FIG. 1B, there is shown an alternative architecture in which camera 100A collects image data from other cameras 100B, 100C, according to one embodiment. For illustrative purposes, camera 100B is shown as a two-dimensional camera, while cameras 100A, 100C are shown as light field cameras; however, any combination of two-dimensional and/or light field cameras can be used. For clarity, many components of cameras 100B, 100C are omitted from FIG. 1B.

Each camera 100B, 100C contains local data storage 101, which may include image data 301 and/or metadata 302 for images captured at that camera 100B, 100C. In the architecture depicted in FIG. 1B, cameras 100B, 100C transfer their image data 301 and/or metadata 302 to camera 100A, which collects and stores such data as frame(s) 202 in local data storage 101. Transfer for data from cameras 100B, 100C to camera 100A can take place according to any suitable method. For example, in one embodiment, cameras 100B, 100C, and/or 100A can be connected to one another via USB cable or other wired connection; in another embodiment such communication can take place via BlueTooth or another personal area network; in yet another embodiment, such communication can take place via any other wired or wireless communications network.

In one embodiment, camera 100A performs operations on data from frame(s) 202, including combining data from frame(s) 202 into one or more picture(s) 201, as described above and as set forth in more detail herein. As discussed above, such combination can take place in response to commands provided by user 110 via input device 108. Image renderer 502 renders final image(s) 107; final image(s) can be presented via output device 106, or otherwise transmitted, stored, and/or manipulated. Other components of camera 100A may operate in the same manner as described above in connection with FIG. 1A. Again, optional hash module 120 is also shown, for generating digest(s) 402 from frame(s) 202, and for authenticating previously generated digest(s) 402.

Figure 1C:
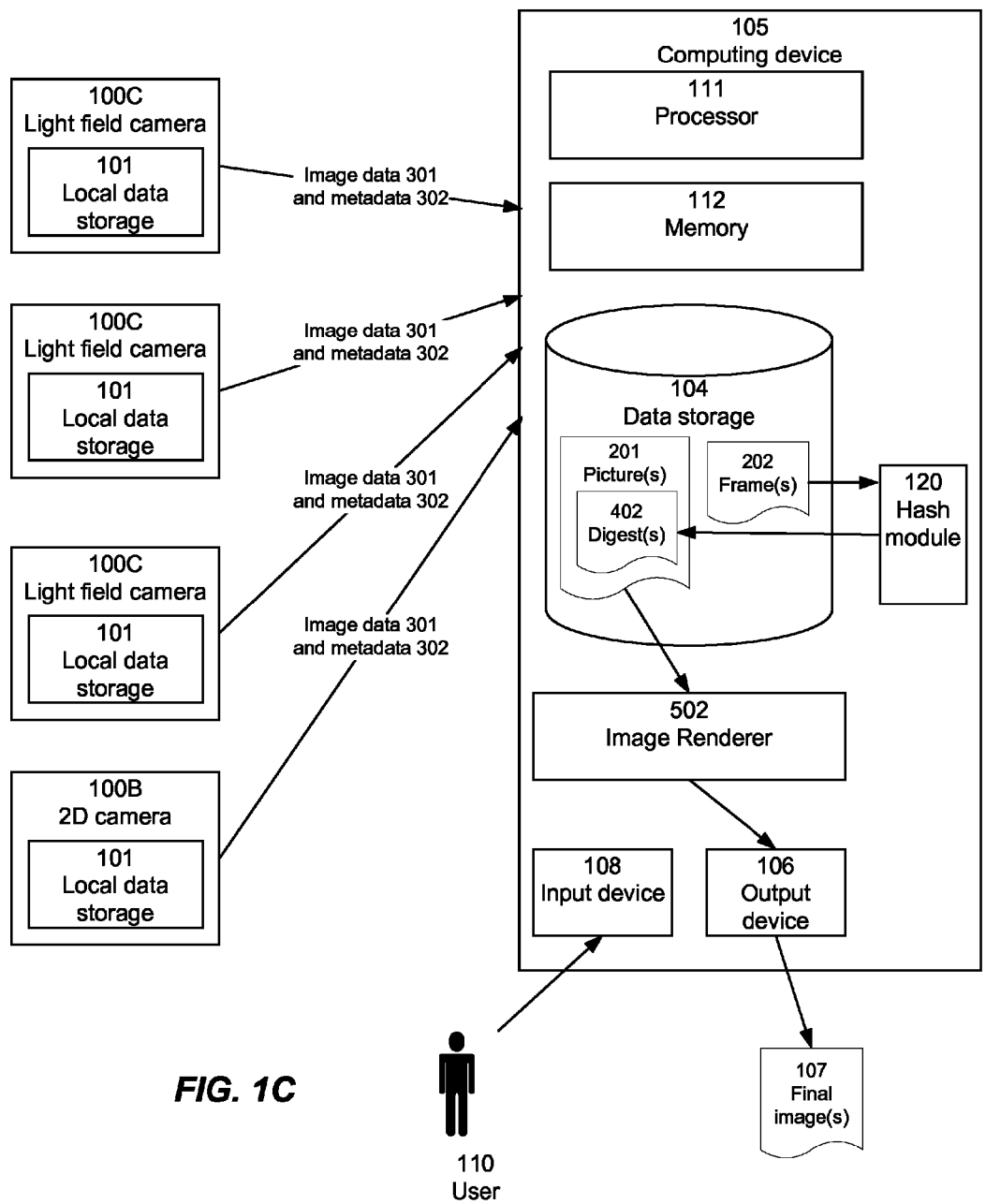
FIG. 1C depicts an architecture for implementing the present invention wherein a computing device collects image data from cameras, according to one embodiment.

Referring now to FIG. 1C, there is shown an alternative architecture in which image data 301 and/or metadata 302 are collected by computing device 105. User 110 interacts with computing device 105 via input device 108, which may include a mouse, trackpad, trackball, keyboard, and/or any of the other input components mentioned above. Computing device 105 may be any electronic device, including for example and without limitation, a desktop computer, laptop computer, personal digital assistant (PDA), cellular telephone, smartphone, music player, handheld computer, tablet computer, kiosk, game system, enterprise computing system, server computer, or the like. In one embodiment, computing device 105 runs an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on such devices.

Computing device 105 stores picture(s) 201 and/or frame(s) 202 in data storage 104, which may be located locally or remotely with respect to computing device 105. Data storage 104 may be implemented as any magnetic, optical, and/or electrical storage device for storage of data in digital form, such as flash memory, magnetic hard drive, CD-ROM, and/or the like. Data storage 104 can also be implemented remotely, for example at a server (not shown in FIG. 1C). Here, hash module 120 is shown as part of computing device 105; however, hash module 120 can instead be implemented in one or more of cameras 100 or in any other suitable component.

In one embodiment, computing device 105 includes a number of hardware components as are well known to those skilled in the art. In addition to data storage 104, input device 108 and output device 106, computing device 105 may include, for example, one or more processors 111 (which can be a conventional microprocessor for performing operations on data under the direction of software, according to well-known techniques) and memory 112 (such as random-access memory having a structure and architecture as are known in the art, for use by the one or more processors in the course of running software). Such components are well known in the art of computing architecture.

Figure 1D:
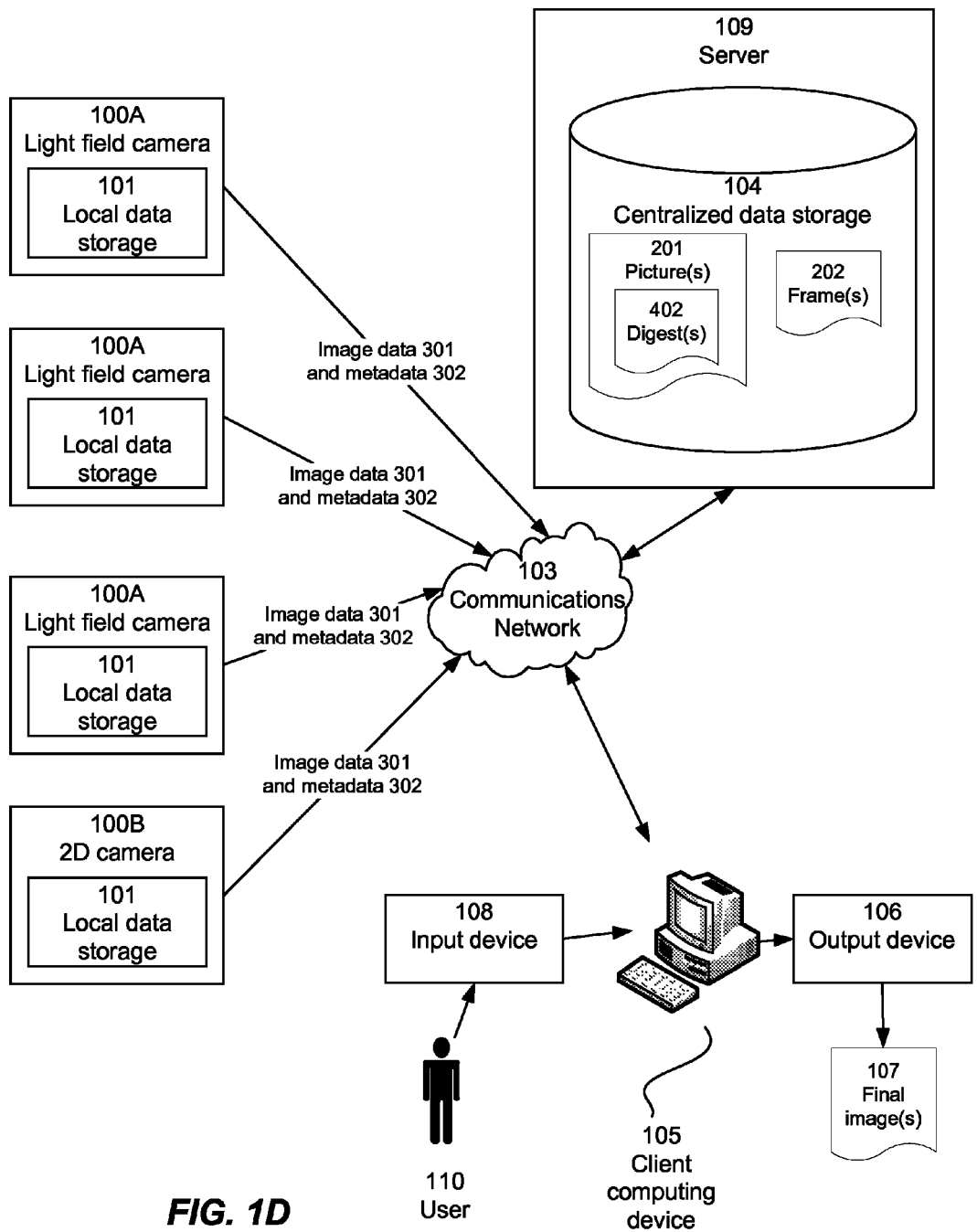
FIG. 1D depicts an architecture for implementing the present invention in a client/server environment, according to one embodiment.

Referring now to FIG. 1D, there is shown an alternative architecture for implementing the present invention in a client/server environment, according to one embodiment. Image data 301 and/or metadata 302 are collected by server 109. Image data 301 and/or metadata 302 may be transmitted to server 109 via any suitable mechanism; one example is communications network 103 such as the Internet. In such an embodiment, image data 301 and/or metadata 302 can be transmitted using HTTP and/or any other suitable data transfer protocol. Client computing device 105 is communicatively coupled with server 109 via communications network 103.

User 110 interacts with computing device 105 via input device 108, which may include a mouse, trackpad, trackball, keyboard, and/or any of the other input components mentioned above. Under the direction of input device 108, computing device 105 transmits corresponding request to cause data to be transmitted, received, and/or manipulated by server 109. For example, server 109 can receive image data 301 and/or metadata 302 from cameras 100A, 100B, and store such data as frame(s) 202 in centralized data storage 104. In response to requests received from client computing device 105, server 109 can perform operations on data, including combining frames 202 to generate picture(s) 201; such picture(s) 201 can then be transmitted to client computing device 105 for viewing on output device 106 as final image(s) 107. As described above, client computing device 105 can also store, transmit, or otherwise manipulate final image(s) 107.

In various embodiments, client computing device 105 may be any electronic device, including for example and without limitation, a desktop computer, laptop computer, personal digital assistant (PDA), cellular telephone, smartphone, music player, handheld computer, tablet computer, kiosk, game system, enterprise computing system, server computer, or the like. In one embodiment, computing device 105 runs an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on such devices. In one embodiment, client computing device 105 includes a network interface (not shown) for enabling communication via network 103, and may also include browser software (not shown) for transmitting requests to server 109 and receiving responses therefrom. In this manner, user 110 can edit, delete, modify, manage, and otherwise manipulate data stored at server 109.

Centralized data storage 104 is shown as being located at server 109, although it can also be implemented locally at computing device 105 or at any suitable location. Providing centralized data storage 104 at server 109 allows pictures(s) 201 and frame(s) 202 to be accessed by a number of computing devices 105 in different locations, using a client/server architecture. However, such architecture is not necessary to practice the present invention. In one embodiment, computing device 105 communicates with serve 109 via communications network 103 according to well known protocols.

In one embodiment, each of a number of cameras 100 generates digests 402 for its frames 202, and immediately shares these digests 402 with other cameras 100 participating in the capture event. Thus, each camera 100 has a "complete" version of a picture 201 representing the capture event, in the sense that each frame 202 for the capture event is represented either by its digest 402 or by the actual frame data 202. Subsequently, (such as, for example, when a suitable transmission path becomes available), each camera 100 transfers actual frame data 202 to central data server 109. Frame data 202 can then be retrieved from server 109 when any of the pictures 201 are to be viewed. In one embodiment, frame data 202 can be retrieved ahead of time, so as to improve response time in viewing a picture 201.

Figure 1E:
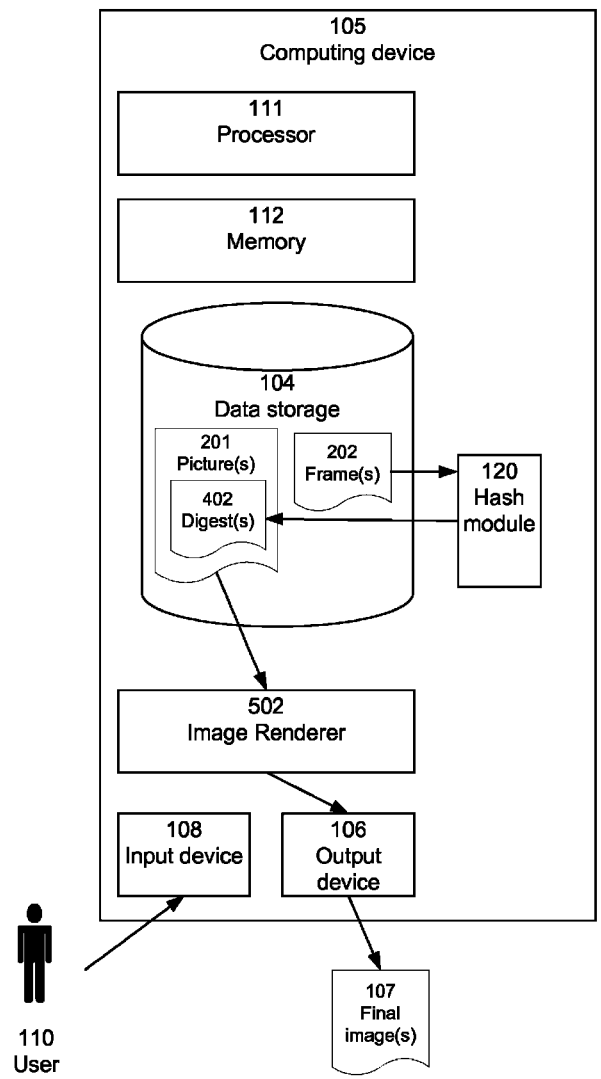
FIG. 1E depicts an architecture for implementing the present invention in a standalone computing device, according to one embodiment.

Referring now to FIG. 1E, there is shown an alternative architecture for implementing the present invention in a standalone computing device 105, according to one embodiment. Here, picture(s) 201 and frame(s) 202 may represent images previously collected from camera(s) and/or other data acquisition devices, and stored at data storage 104 of computing device 105. FIG. 1E illustrates that the techniques of the present invention can be practiced on image data without requiring the source of the image data to be present. Thus, for example, user 110 can manipulate frame(s) 202 to generate picture(s) 201 by interacting with computing device 105 via input device 108, causing processor 111 to perform operations on frame(s) 202 and generate picture(s) 201. As described above, individual frame(s) 202 can be taken from different cameras and/or at different times.

In one embodiment, computing device 105 includes the same components as described above in connection with FIG. 1C.

Data Structures

Figure 2:
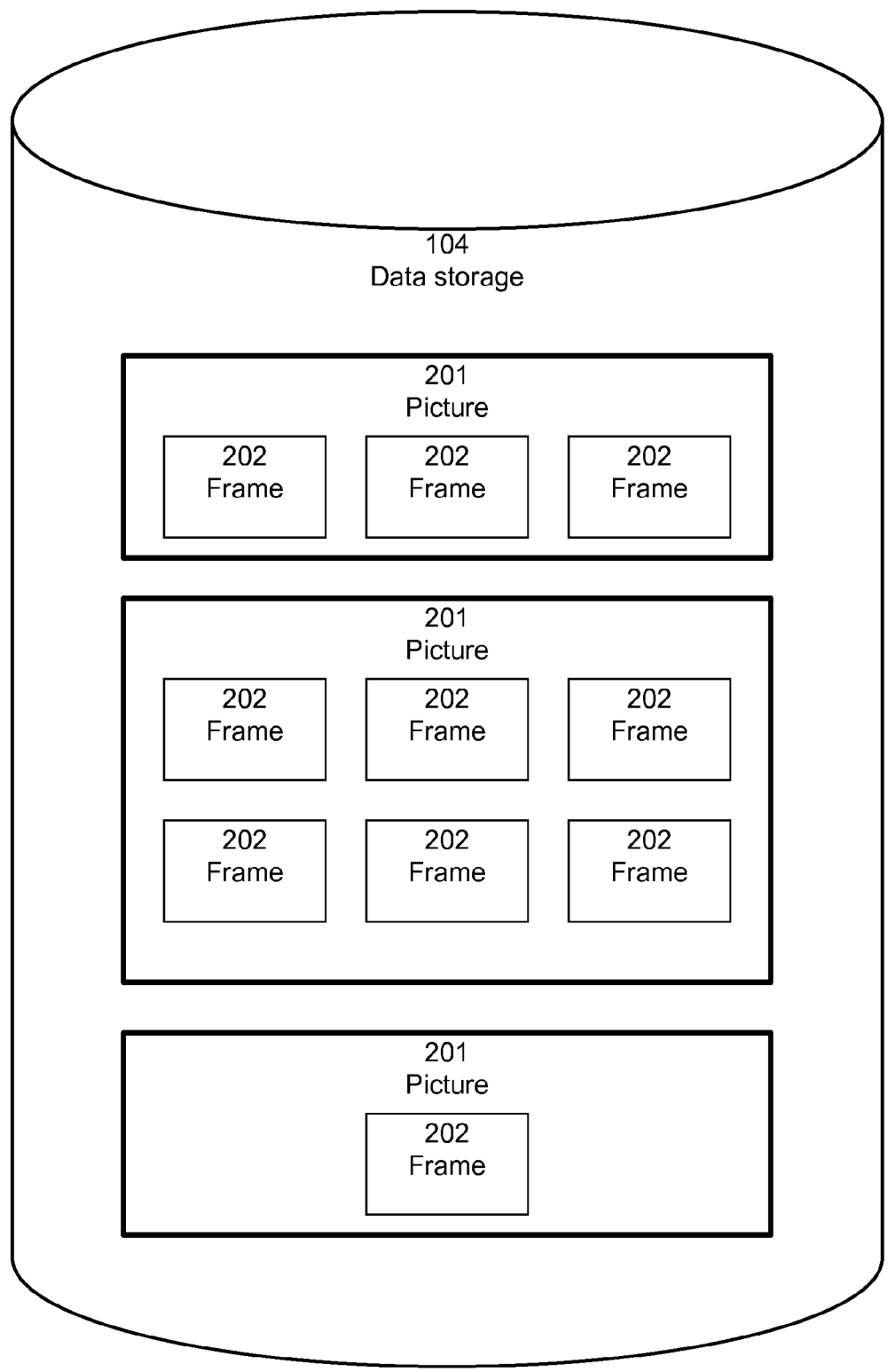
FIG. 2 depicts an example of a relationship between pictures and frames, according to one embodiment.

Referring now to FIG. 2, there is shown an example of a relationship between pictures 201 and frames 202, according to one embodiment. Frames 202 can be generated by cameras 100 and/or other visual data acquisition devices; each frame 202 includes data related to an individual image element such as an image captured by a camera 100 or other visual data acquisition device. Any number of frames 202 can be combined to form a picture 201. For example a picture 201 may include frames 202 captured by different cameras 100 either simultaneously or in succession, and/or may include frames 202 captured by a single camera 100 in succession. Frames 202 may be captured as part of a single capture event or as part of multiple capture events. Pictures 201 may include any type of frames 202, in any combination including for example two-dimensional frames 202, light field frames 202, and the like. A picture 201 with one or more light field frames 202 is referred to as a light field picture.

In one embodiment, each frame 202 includes data representing an image detected by the sensor of the camera (image data), and may also include data describing other relevant camera parameters (metadata), such as for example, camera settings such as zoom and exposure time, the geometry of a microlens array used in capturing a light field frame, and the like. The image data contained in each frame 202 may be provided in any suitable format, such as for example a raw image or a lossy compression of the raw image, such as for example, a file in JPG, EXIF, BMP, PNG, PDF, TIFF and/or HD Photo format. The metadata may be provided in text format, XML, or in any other suitable format.

For illustrative purposes, in FIG. 2, frames 202 are shown as being enclosed by pictures 201. However, one skilled in the art will recognize that such a representation is conceptual only. In fact, in one embodiment, pictures 201 are related to their constituent frame(s) 202 by virtue of pointers in database records. In one embodiment, any particular frame 202 can be a constituent of any number of pictures 201, depending on how many pictures 201 contain a pointer to that frame 202. Similarly, any particular picture 201 can contain any number of frames 202, depending on how many frames 202 are identified as its constituents in its database record. In another embodiment, picture 201 may be a container file that actually contains frame(s) 202. In general, references herein to a picture 201 "containing" one or more frames 202 mean that those frames 202 are associated with picture 201.

In one embodiment, if a frame 202 appears in more than one picture 201, it need only be stored once. Pointers are stored to establish relationships between the frame 202 and the various pictures 201 it corresponds to. Furthermore, if frame 202 data is not available, frame 202 can be represented by its corresponding digest 402, as described herein.

Accordingly, the system of the present invention provides a mechanism for storing and manipulating pictures 201 having an arbitrary number of frames 202. A collection of frames 202 may be designated as constituents of a particular picture 201 based on any appropriate criteria. In one embodiment, the mode of the capture event may define the relationship between a set of frames 202 and thus cause such frames 202 to be constituents of a common picture 201. For example, a photographer may capture a series of images using exposure bracketing. As another example, a set of images having different lighting characteristics can be captured, so that a final image can be generated from the captured images using interpolation or some other form of combination; such a process is referred to as "relighting". In one embodiment, an indication that bracketing or relighting is being used may cause the frames 202 captured in a sequence to be associated with a common picture 201. Such an indication may be provided, for example, in metadata for frame(s) 202. However, one skilled in the art will recognize that any assignment of frames to pictures is allowed, whether specified automatically or manually, and that such assignment can be taken at the time of image capture (i.e., immediately after a capture event) or at any subsequent time. Thus, the system of the present invention allows pictures 201 having arbitrary sets of frames 202 to be created. In one embodiment, post-capture editing tools, such as image manipulation software, can be used for manually specifying such relationships between pictures 201 and frames 202.

Figure 3:
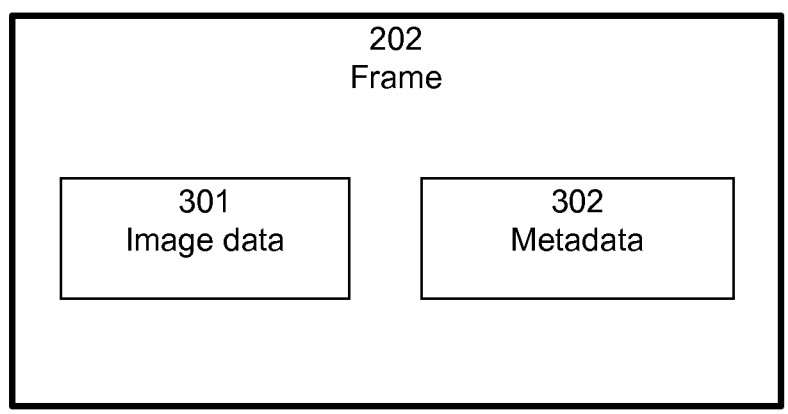
FIG. 3 depicts an example of a data structure for a frame, according to one embodiment.

Referring now to FIG. 3, there is shown an example of a data structure for a frame 202, according to one embodiment. In one embodiment, frame 202 includes image data 301 and/or metadata 302, although some frames 202 may omit one or the other. In various embodiments, frames 202 can include image data 301 for two-dimensional and/or light field sensor images. In other embodiments, other types of image data 301 can be included in frames 202, such as three-dimensional image data and the like. In one embodiment, a depth map of the scene is extracted from the light field, so that three-dimensional scene data can be obtained and used. In another embodiment, a camera can capture a two-dimensional image, and use a range finder to capture a depth map; such captured information can be stored as frame data, so that the two-dimensional image and the depth map together form a three-dimensional image.

In one embodiment, metadata 302 includes fields for various parameters associated with image data 301, such as for example camera settings such as zoom and exposure time, the geometry of a microlens array used in capturing a light field frame, and the like.

In one embodiment, frames 202 are stored in frame files. Frame files may contain additional data, for example to enable operating systems and/or applications to work with frames 202. Examples of such additional data include: a file format identifier, to allow applications to recognize frame files; and thumbnail image, in a format that allows an operating system to display a thumbnail as a representation of the file. For ease of nomenclature, the term "frame" is used herein to refer both to frames and to their stored representations.

In one embodiment, metadata 302 may include identifying data, such as a serial number of the camera or other device used to capture the image, an identifier of the individual photographer operating the camera, the location where the image was captured, and/or the like. In some situations, user 110 or some other individual may not want such information to be readily available to anyone interacting with frame 202.

As described below, in one embodiment, such identifying data, as well as any other data that is not critical to the interpretation of image data 301, may be provided in a removable section of metadata 302. Thus, user 110, or an administrator or other individual, can specify that such data be removed or suppressed, so as to preserve privacy.

Metadata 302 can be provided in any appropriate format, such as for example a human-readable text file including name-value pairs. In one embodiment, metadata 302 is represented using name-value pairs in JavaScript Object Notation (JSON). In one embodiment, metadata 302 is editable by user 110 or any other individual having access to frame 202. In one embodiment, metadata 302 is provided in XML or text format, so that any text editor can be used for such editing.

Digests

Figure 4A:
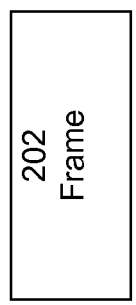
FIG. 4A depicts a conceptual representation of digest generation, according to one embodiment.
Figure 4A:
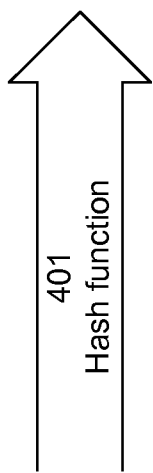
Figure 4A:

In one embodiment, frames 202 can be represented as digests 402. Referring now to FIG. 4A, there is shown a conceptual representation of generating a digest 402 from a frame 202. A hash function 401 is defined, for generating a unique digest 402 for each frame 202. Hash function 401 can be any mathematical function that operates on the digital data that represents frame 202, to generate output that is unique for that frame 202, or output that is extremely unlikely to be identical for any two frames 202. In one embodiment, digests 402 are small relative to their corresponding frames 202, so that transmission, storage, and manipulation of such digests 402 is faster and more efficient than such operations would be on the frames 202 themselves. For example, in one embodiment, each digest is 256 bytes in length, although one skilled in the art will recognize that they may be of any length. A digest can also be referred to as a "hash".

Digests 402 are substantially unique with respect to one another, so that any attempt to modify data of a frame 202 can be detected by performing hash function 401 on frame 202 data, since the resulting digest 402 would fail to match any previously stored digest 402 for that frame 202. In this manner, the system of the present invention is able to enforce immutability of digests 402 in an efficient manner. Computation of digests 402 by hash function 401 can be performed at camera 100 or any data acquisition device, or at computing device 105, or at server 109. Computation of digests 402 can take place at the time of image capture or at any subsequent time. Verification of image integrity can be performed at any suitable time by recalculating digest 402 from frame 202 data and comparing the result with a previously stored version of digest 402; any difference indicates that the underlying frame 202 has been altered.

In one embodiment, hash module 120 performs hash function 401 on frame 202 including image data and metadata 302. Hash module 120 may be implemented in software on camera 100, computing device 105, and/or server 109, and may be part of image renderer 502 or any other component, or may be a separate component. By performing hash function 501 on image data and metadata 302, the system of the present invention ensures that changes to either image data and/or metadata 302 can be detected. In this manner, hash function 401 is used to enforce immutability of both image data and metadata 302.

In one embodiment, hash function 401 is designed so that non-substantive changes to metadata 302 do not cause changes to the resultant digest 402. For example, addition or deletion of whitespace, addition or deletion of comments, reordering of parameters, and the like, do not affect the value of digest 402. In this manner, frame immutability is enforced without hindering the ability to make non-substantive changes that may improve readability but do not change the operation of metadata 302. In one embodiment, hash function 401 ignores any removable sections that are not critical to image rendering, so that such sections can be removed or included without affecting digest 402.

Figure 4B:
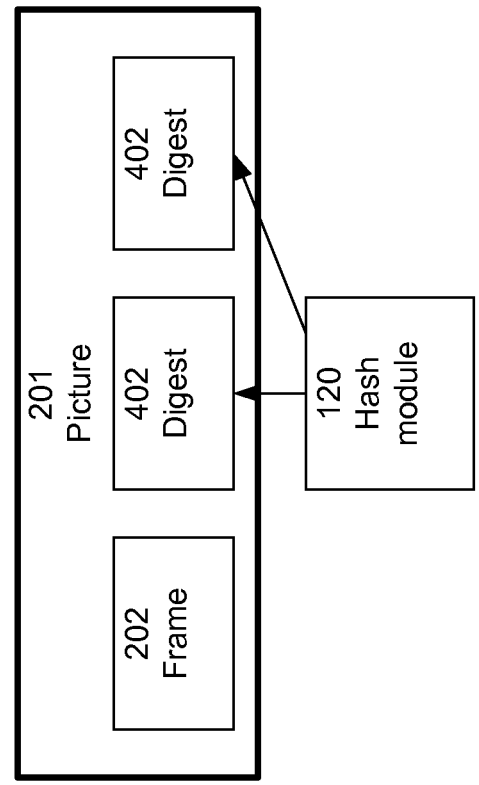
FIG. 4B depicts an example of a relationship between pictures, frames, and digests, according to one embodiment.

Referring now to FIG. 4B, there is shown an example of a relationship between pictures 201, frames 202, and digests 402, according to one embodiment. Here, one frame 202 is represented by the frame data itself, while two other frames are represented by digests 402. Any combination of frames 202 and/or digests 402 can be included in any particular picture 201. A picture 201 that includes frames 202 but no digests 402 is referred to as a framed picture. Thus, once actual frame data is available and stored within a picture 201, the picture 201 becomes a framed picture which can be rendered without reference to additional data. Hash module 120 can be used to generate digests 402, as well as to authenticate digests 402.

In one embodiment, data acquisition devices such as cameras 100 can share digests 402 rather than frames 202, while retaining their own frames 202 locally, so as to save bandwidth and/or storage space. Once digests 402 for a picture 201 are shared among cameras 100, each camera 100 has a complete version of picture 201; specifically, each frame 202 in picture 201 is represented either by frame data itself (as captured on that camera 100) or as a digest 402 of the frame 202 (which was computed, for example, by the camera 100 that captured that frame 202).

Subsequently, after pictures 201 from various cameras 100 have themselves been communicated to a central repository such as server 109, or are otherwise able to share data, final images 107 can be generated from pictures 201, using actual frame 202 data rather than digests 402.

In one embodiment, digests 402 help to ensure the integrity of frame 202 data. Since digests 402 can be recomputed from frames 202 at any time, corrupted and/or modified frames 202 can easily be detected.

As described above, in one embodiment, user 110 can manipulate pictures 201 by interacting with computing device 105 and/or camera 100. Input device(s) 108 may be provided for receiving input from user 110. In one embodiment, a user interface can be provided to enable user 110 to manipulate pictures 201 in various ways. For example, user 110 can specify various operations to be performed on constituent frames 202 of pictures 201, including brightening, darkening, scaling, cropping, rotating, blurring, changing color balance, and the like. Users 110 can also specify that frames 202 are to be combined various ways, and specify relationships between individual frames 202.

However, in one embodiment, such manipulations are not stored as changed frame 202 data itself. Rather, they are stored as representations of operations to be performed on frames 202, so that the operations can be re-executed whenever picture 201 is to be rendered. Thus, instead of storing the result of an operation, in one embodiment the system of the present invention stores a representation of the operation itself. Underlying frames 202 can thus be left untouched.

In one embodiment, such operations are stored within the picture file 201 itself. Pictures 201 thus have the ability to store a recipe (instructions) for creating a particular final image, the ingredients (frames 202) for the recipe are maintained in their original form. Such an approach preserves the integrity of the original captured images and associated metadata (within frames 202), since such original frames 202 can always be retrieved no matter what operations are specified to be performed on such frames 202 in connection with a particular picture 201.

Figure 5:
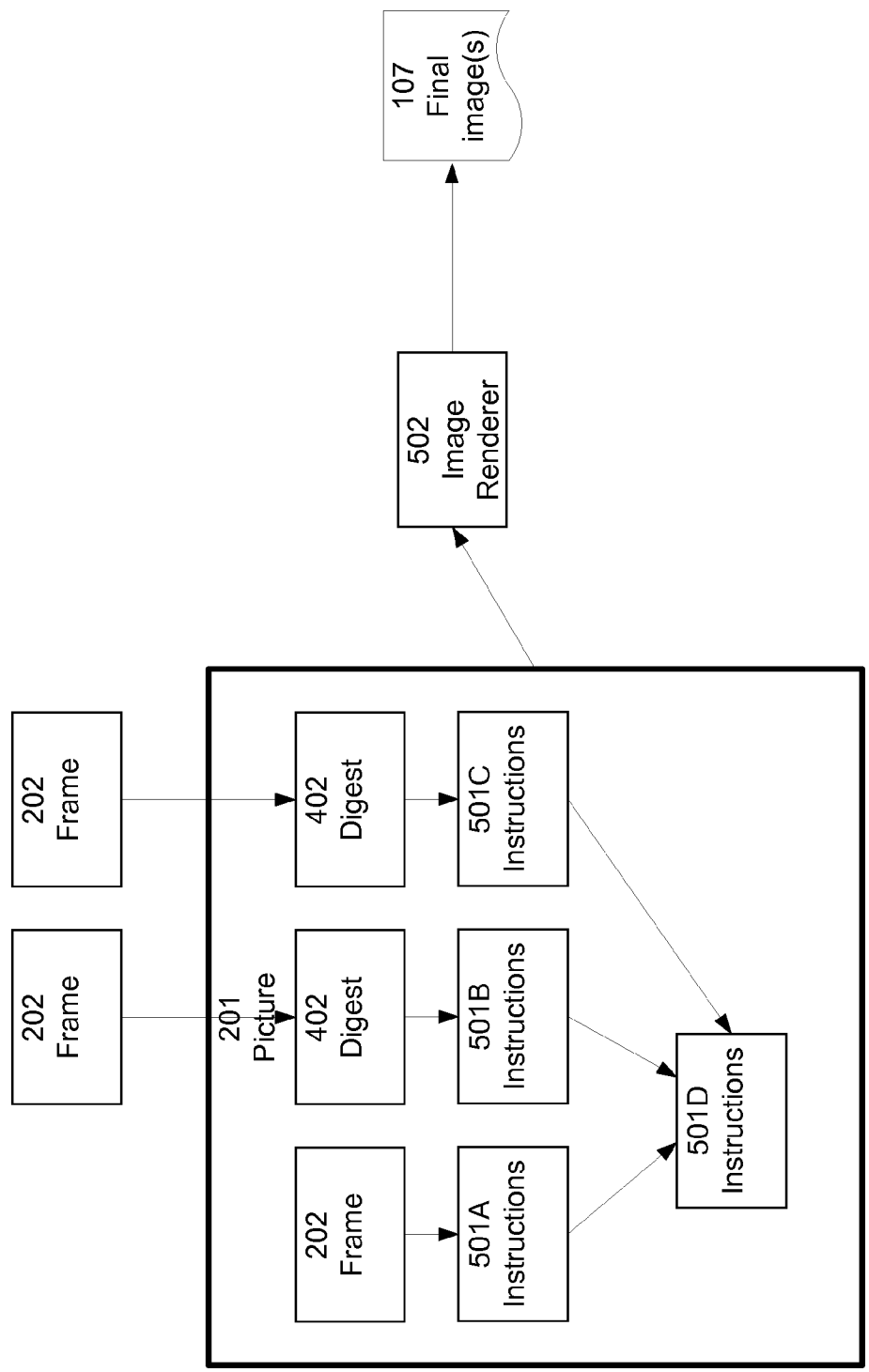
FIG. 5 depicts an example of generation of a final image from components of a picture, according to one embodiment.

Referring now to FIG. 5, there is shown a block diagram depicting generation of a final image 107 from components of a picture 201, according to one embodiment. Frame 202 represents image data. Digests 402 are generated from frames 202, such as frames 202 captured at other cameras 100. Instructions 501 are representations of modifications and other operations user 110 has performed on frames 202 of picture 201.

Image renderer 502 (which may be implemented on computing device 105, camera 100, or any other component), generates final image 107 for display on output device 106, or for storage or transmission. When generating image 107, renderer 502 uses data stored in picture 201, including frames 202 and instructions 501. Specifically, renderer 502 performs operations on frames 202 based on instructions 501. Prior to rendering final image 107, original frame(s) 202 can be obtained for any stored digest(s) 402, and the authenticity of such frame(s) 202 can be confirmed by applying hash function 401 and comparing the result to stored digest(s) 402. In one embodiment, image renderer 502 is implemented as a software application.

In one embodiment, final image 107 does not contain information describing the frames 202 and instructions 501 that were used in its creation. Rather, final image 107 is generated in any conventional image format, including for example RAW, TIFF, JPG, GIF, or the like. In other embodiments, however, some or all of the data describing frames 202 and instructions 501 may be included as metadata or in another format.

For example, instructions 501 may include a list of user-specified edits to displayed images, such as cropping, rotating, changing contrast, refocusing, and the like. Instructions 501 may indicate operations on a single frame 202 or on any combination of frames 202. In some cases, a series of instructions 501 may be applied in a specified order, so that the result of one instruction 501 is passed to the next instruction 501. In the example of FIG. 5, instructions 501A, 501B, 501C are performed on various frames 202, and then instructions 501D operate to combine the respective results of instructions 501A, 501B, 501C. When generating image 107, renderer 502 applies such instructions 501 to image data stored in frame 202, in the specified order, to generate final image(s) 107. In one embodiment, such steps are performed each time the image is to be displayed or rendered. In one embodiment, such operations include post-processing as described in related U.S. Utility application Ser. No. 12/703,367 for "Light Field Camera Image, File and Configuration Data, and Method of Using, Storing and Communicating Same," filed Feb. 10, 2010, the disclosure of which is incorporated herein by reference.

In one embodiment, a user interface can be provided, so that user 110 can interactively specify parameters for operations to be performed; for example, a slider can be provided for controlling refocusing operations.

In one embodiment, rendering performance is improved by including acceleration structures within pictures. Such acceleration structures may include metadata that can be applied to frames 202. Such metadata can be derived from frames 202 and/or user-supplied metadata.

Figure 6:
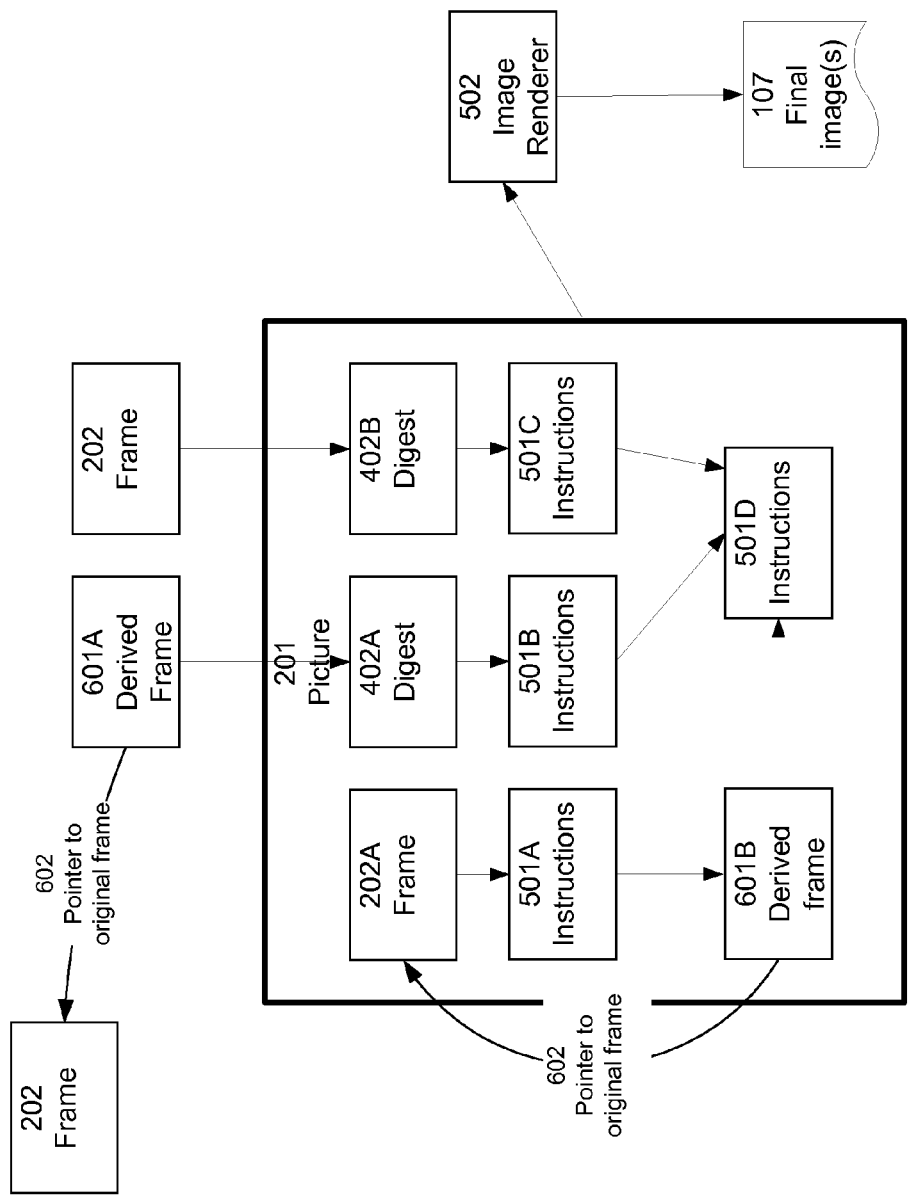
FIG. 6 depicts an example of the use of derived frames in generating a final image from components of a picture, according to one embodiment.

For example, in one embodiment, the system can store frames that are derived from application of specified operations. Referring now to FIG. 6, there is shown an example of the use of such an acceleration structure, referred to as derived frames 601. Derived frames 601 can be generated by applying instructions 501 to frames 202 and storing the result or a digest 402 of the result. Storage of derived frames 601 can improve efficiency, since image renderer 502 need not regenerate the frame each time final image 107 is to be rendered. Rather, derived frames 601 from a previous rendering operation can be retrieved. Derived frames 601 can thus be used as an intermediate storage mechanism so as to avoid redundant recalculation.

In one embodiment, derived frames 601 are generated by image renderer 502 and stored as components of picture 201. Digests 402 of derived frames 601 can be generated, stored, shared, and/or transmitted in a manner similar to that described above for digests 402 of frames 202. In one embodiment, derived frames 601 and/or their digests 402 can be stored in a cache (not shown) for rapid access.

In one embodiment, derived frames 601 can be regenerated when instructions 501 change, so that set of available derived frames 601 is kept current.

In one embodiment, generation of derived frames 601 is triggered manually in response to user 110 commands. In another embodiment, the system of the present invention automatically generates derived frames 601 when certain defined circumstances arise; for example, when it is determined that generation of a derived frame 601 is likely to be useful and storage space is available. A determination that generation of a derived frame 601 is likely to be useful may depend, for example, on detection that certain instructions 501 are being repeatedly applied to the same frame(s) 202. In one embodiment, a user 110 or other entity can specify whether or not acceleration structures such as derived frames 601 should be used for a particular picture 201 or frame 202. In one embodiment, the specification as to whether an acceleration structure should be used may depend on the characteristics of the destination renderer 502; for example, a renderer 502 with superior processing power may not need an acceleration structure, whereas one which has inferior processing power (and/or is burdened by other concurrent tasks) may use acceleration structures. As another example, the available of cache storage space may determine whether acceleration structures such as derived frames 601 should be used.

In the example of FIG. 6, two derived frames 601 are shown, for illustrative purposes. Derived frame 601B is generated from frame 202A and is stored within picture 201. Derived frame 601A was generated based on some instructions not part of picture 201; for example, derived frame 601A may have been provided by some other device. Thus, picture 201 includes digest 402A of derived frame rather than derived frame 601A itself.

In this example, when picture 201 is to be rendered, the system of the present invention retrieves derived frame 601A and checks it against digest 402A. Then, image renderer 502 applies instructions as indicated: instructions 501B are applied to derived frame 601A and instructions 501C are applied to digest 402B. Instructions 501A need not be performed, since derived frame 601B is already available and contains the results of application of instructions 501A to frame 202A. Instructions 501D are applied to the results of instructions 501B and 501C in combination with derived frame 601B, to generate final image 107 for output.

Note that the example of FIG. 6 illustrates the application of instructions 502 to frames 202 as well as derived frames 601. In general, any number of instructions can be applied in succession to one or more frame(s) 502, derived frame(s) 601, and/or combination(s) thereof.

Derived frames 601 may include metadata, if appropriate, in the same manner as frames 602. In one embodiment, each derived frame 601 includes a pointer 602 or other identifier indicating the frame 202 from which it was derived. This allows a mechanism by which the original frame 202 to be retrieved. This pointer 602 can be provided as metadata within derived frame 601. Thus, for example, if user 110 wishes to perform an operation on the original frame 202, and only a derived frame 601 is available, the system of the present invention can refer to pointer 602 within derived frame 601 to locate and retrieve the corresponding original frame 202 so that it can be edited, modified, and more manipulated as appropriate.

Additional forms of acceleration structures can be used. For example, if the frame data are light field images, a stack of output images can be computed, each with a different focus distance. These images can be stored, so that a picture 201 can later be "refocused" by selecting one of the pre-computed images. If user 110 selects an apparent focal distance for which no image was pre-computed, such as a distance between two stored distances, interpolation and/or extrapolation can be used to generate an appropriate resultant image in an efficient manner.

The use of digests improves the efficiency with which frames 202 can be aggregated into pictures 201, particularly when such aggregation is deferred (i.e., takes place substantially later than image capture). For example, in situations where frames 202 from different cameras 100 or other data acquisition devices are to be aggregated with one another, embodiments of the present invention make such transfer of information describing such frames 202 more efficient. Digests 402 can be shared among the various devices, so that actual image data need not be repeatedly transferred. A device can refer to frame 202 data by its corresponding digest 402, with the assurance that when actual frame 202 data arrives, it is authentic. The authenticity of frame 202 data can be assured by recomputing digest 402 from frame 202 data, and comparing the result with stored digest 402. Any discrepancy indicates that frame 202 has been modified or corrupted.

An example of a data structure employing digests is as follows:

```
"picture" : {
    frame: {
        image: blobref,
        metadata: blobref,
        privateMetadata: blobref
    }
}
```

Here, a picture 201 is defined as having a single frame 202. Frame 202 image data, metadata, and private metadata, each indicated as a "blobref". In one embodiment, each "blobref" includes a hash type (i.e., an identification of the hash function) and hash data, forming the digest 402. For example, a blobref might be "SHA1-2fd4e1c67a2d28fced849ee1bb76e7391b93eb12"; "sha1" indicates the hash type, and the remainder of the data is the hash data itself. The hash data can be of any suitable length, such as for example 40 hexadecimal digits.

The blobref refers to a binary large object (BLOB), according to well known techniques; this reference can be de-referenced by a blob server (described below), which returns the BLOB that the blobref represents.

In this example, frame 201 separates private metadata from other metadata. For example, metadata that might identify the photographer, location, and/or equipment can be omitted by deleting the privateMetadata blobref from frame 202.

Archival Support

In one embodiment, the user interface for enabling user 110 to manipulate pictures 201 allows various operations to be performed on pictures 201; however, such operations do not change the underlying frame 202 data itself. In one embodiment, the user interface does not provide a way for user 110 to delete frames 202; in another embodiment, such an operation is possible but only for certain authenticated users 110 and/or only under special conditions. Even if a picture 201 is deleted, in one embodiment its component frames 202 remain stored.

By making deletion of frames 202 difficult or impossible, the system of the present invention encourages persistence of underlying data and thereby provides support for archival functions. In addition, the techniques of using digests 402, as described above, ensure authenticity of frames 202, by providing a way for modifications or corruption of frames 202 to be detected. Such assurances of authenticity also help to support archival functions.

Furthermore, embodiments of the present invention allow frames 202 to be recombined in different ways to form different pictures 201, without affecting frames 202 themselves. In this manner, users 110 are free to perform such recombination while archival functions are supported.

Example

HDR Imaging

Figure 7:
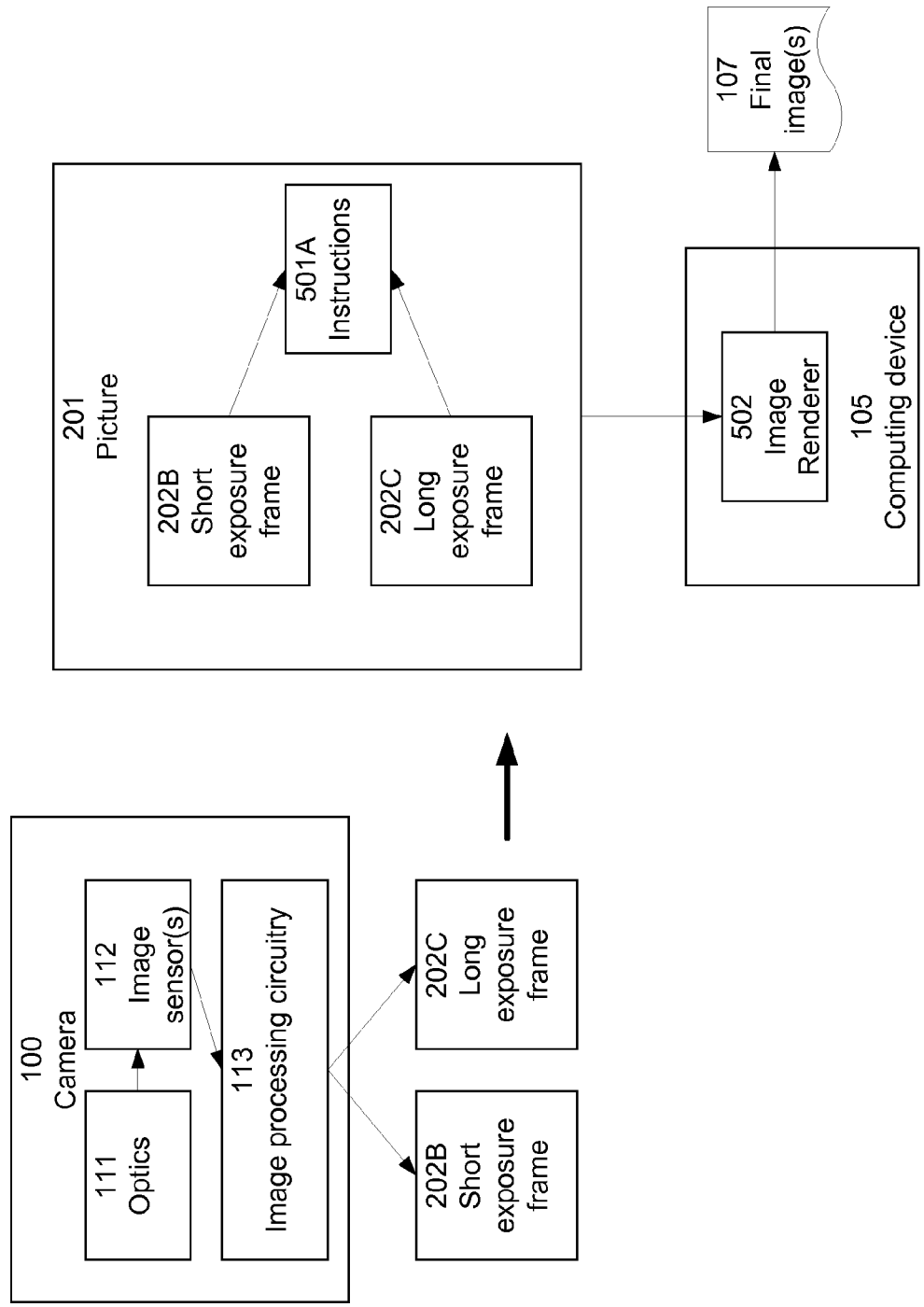
FIG. 7 depicts an example of generation of a high-dynamic range final image from frames having different exposure lengths, according to one embodiment.

Referring now to FIG. 7, there is shown an example of generation of a high-dynamic range final image 107 from frames 202 having different exposure lengths, according to one embodiment. High-dynamic range (HDR) imaging is a technique that combines two or more images having different exposure lengths so as to generate an image having a higher dynamic range than do the source images. HDR imaging thus provides a way to overcome the limited dynamic range available in some image sensors.

In FIG. 7, the techniques of the present invention are applied to generate an HDR final image 107. Optics 111, image sensor(s) 112, and image processing circuitry 113 of camera 110 generate two or more frames 202 having different exposure lengths. In the example, two frames 202 are shown: short-exposure frame 202B and long-exposure frame 202C. Frames 202B, 202C are shown as being captured by a single camera 100; alternatively, they may come from different cameras or other data acquisition devices.

According to the techniques of the present invention, frames 202B, 202C are represented in picture 201. Metadata (not shown) may also be included in frames 202B, 202C, for example to identify the exposure lengths and other information about the images represented therein. Instructions 501A specify how frames 202B, 202C are to be combined to generate HDR final image 107, for example using HDR processing techniques to extract various portions of images depending on contrast levels.

In the example, HDR final image 107 is generated by image renderer 502 running at computing device 105. However, in other examples, image renderer 502 could be located at camera 100 or at any other location. In the example, renderer 502 combines frames 202B, 202C based on instructions 501A. In one embodiment, a user interface can be presented to allow the user to specify parameters for the rendering operation; for example a slider control (not shown) can be presented to allow user 110 to specify the overall contrast level of HDR final image 107.

In other examples, the representations of frames 202B, 202C within picture 201 may be replaced by digests (not shown in FIG. 7) according to the techniques described above.

JavaScript Object Notation (JSON)

In one embodiment, metadata for the present invention is stored using a JavaScript Object Notation (JSON) format, which provides a standardized text notation for objects. JSON is sufficiently robust to provide representations according to the techniques described herein, including objects, arrays, and hierarchies. JSON further provides a mechanism which is easy for humans to read, write, and understand.

One example of a generalized format for a JSON representation of an object is as follows:

```
object      ::= { } | { members }
members     ::= pair | pair , members
pair        ::= string : value
array       ::= [ ] | [ elements ]
elements    ::= value | value , elements
value       ::= string | number | object | array |
                true | false | null
string      ::= "" | "chars"
number      ::= int | intFrac | intExp | intFracExp
```

Thus, the JSON representation can be used to store frame metadata in a key-value pair structure.

As described above, frame metadata may contain information describing the camera that captured an image. An example of a portion of such a representation in JSON is as follows:

```
"camera" :
{
    "make" : "Canon",
    "model" : "EOS 50D"
    "firmware" : "2.0.34 beta"
}
```

Data stored in the JSON representation may include integers, floating point values, strings, Boolean values, and any other suitable forms of data, and/or any combination thereof.

Given such a structure, a software application (such as image renderer 502) can access data in a frame 202 by performing a key lookup, and/or by traversing or iterating over the data structure, using known techniques. In this manner, image renderer 502 can use the data found within frames 202 and pictures 201 when generating final image(s) 107 and/or when combining frames 202 into pictures 201.

The JSON representation may also include structures; for example a value may itself contain a list of values, forming a hierarchy of nested key-value pair mappings. For example:

```
"key1" :
{
    "key 2" : {
        "key3":[2.12891, 1.0, 1.29492]
    }
}
```

In one embodiment, binary data is stored in the JSON structure via a base64-encoding scheme.

Privacy concerns are addressed as described above. Identifying data, as well as any other data that is not critical to the interpretation of image data, may be provided in a removable section of metadata, for example in a separate section of the JSON representation. This section can be deleted without affecting image rendering operations, since the data contained therein is not used for such operations. An example of such a section is as follows:

```
"removable" : {
    "serial" : "520323552",
    "gps" : { ... },
    ...
}
```

Data to be used in rendering images may be included in any number of separate sections. These may include any or all of the following:
- a description section, providing a general description of the equipment used (without specific identifying information)
- an image section, containing image data;
- a devices section, specifying settings and parameters for the equipment used;
- a light field section, containing light field data (if the frame contains a light field image);

One skilled in the art will recognize that these are merely exemplary, and that any number of such sections can be provided.

Description section can contain any information generally describing the equipment used to capture the image. An example of a description section is as follows:

```
"camera" :
{
    "make" : "Canon",
    "model" : "EOS 50D"
    "firmware" : "2.0.34 beta"
}
```

Image section contains image data. Image section can contain color-related fields for converting raw images to RGB format. Image section can contain a "format" value indicating whether the format of the image is "raw" or "rgb". In addition, various other fields can be provided to indicate what corrections and/or other operations were performed on the captured image.

An example of an image section is as follows:

```
"image" : {
    "timeStamp" : "2009:07:04 03:00:46 GMT",
"orientation" : 1,
    "width" : 4752,
"height" : 3168,
    "format" : "raw",
    "raw" : {
        "mosaic" : {
            "type" : "r,g;g,b",
            "firstPixelMosaicIndex" : { "x" : 0, "y" : 1 } },
        "pixelRange" : { "black" : 1024, "white" : 15763 },
        "pixelFormat" : { "bpp" : 16, "endian" : "little", "shift" :
4 } },
    "whiteBalanceMultipliers" : [2.12891, 1, 1.29492],
    "ccmRgbToSrgb" : [2.26064, −1.48416, 0.223518, −0.100973,
1.59904,
                            −0.498071, 0.0106269, −
0.58439, 1.57376] },
    "gamma" : [0, 1, 2, 4, 6, 9, ..., 4050, 4070, 4092]
}
```

Devices section specifies camera hardware and/or settings; for example, lens manufacturer and model, exposure settings, and the like. In one embodiment, this section is used to break out information for component parts of the camera that may be considered to be individual devices. An example is as follows:

```
"devices" : {
    "lens" : {
        "make" : "Tamron",           "model" : "xxx",
        "macro" : true,              "focalLength" : 50,
        "fNumber" : 4,               "motorPosition" :
{ "zoom" : 200, "focus" : 120 } },
    "flash" : {
        "make" : "Canon",            "model" : "xxx",
        "firmware" : "beta",         "brightness" : 2.3,
        "duration" : 0.1 },
    "ndfilter" : { "stops" : 3.0 },
    "sensor" : {
        "exposureDuration" : 0.1,    "iso" : 400,
        "analogGain" : 34.0,         "digitalGain" : 1.0
}
    "accelerometer " : { "samples" : [ ... ] }
}
```

Light field section provides data relating to light fields, image refocusing, and the like. Such data is relevant if the image is a light field image. An example is as follows:

```
"lightfield" : {
    "index" : 1,
    "mla" : {
        "type" : "hexRowMajor",
"pitch" : 51.12,
        "scale" : { "x" : 1, "y" : 1 },
"rotation" : 0.002319,
        "sensorOffset" : { "x" : −15.275, "y" : −44.65, "z" : 200 },
        "defects" : [ { "x" : 1, "y" : 3}, { "x" : 28, "y" : 35} ]
},
    "sensor" : { "pixelPitch" : 4.7 },
    "lens" : { "exitPupilOffset" : { "x" : 0.0, "y" : 0.0, "z" : 57.5 } },
    "intensityFunction" : {
        "dimensions" : { "x" : 44, "y" : 32, "u" : 13, "v" : 13 },
        "jpegDataStream" :
"/9j/4AAQSkZJRgABAQAAAQABAAD/DBAQE .....
mJFZ//Z" }
}
```

In one embodiment, the "defects" key refers to a set of (x,y) tuples indicating defective pixels. Such information can be useful in generating images, as defective pixels can be ignored, recomputed from adjacent pixels, down-weighted, or otherwise processed. One skilled in the art will recognize that various techniques for dealing with such defects can be used. If a concern exists that the specific locations of defects can uniquely identify a camera, raising privacy issues, the "defects" values can be omitted or can be kept hidden so that they are not exposed to unauthorized users.

Frame digests are supported by the JSON data structure. As described above, a digest can be stored as both a hash type and hash data. The following is an example of a digest within the removable section of a JSON data structure:

```
"removable" : {
    "serial" : "520323552",
    "gps" : { ... },
    "digest" : {
        "type" : "sha1",
        "hash" : " 2fd4e1c67a2d28fced849ee1bb76e7391b93eb12" }
}
```

In various embodiments, metadata (such as JSON data structures) can be included in a file separate from the image itself. Thus, one file contains the image data (for example, img_0021.jpg, img_0021.dng, img_0021.raw, or the like), and another file in the same directory contains the JSON metadata (for example, img_0021.txt). In one embodiment, the files can be related to one another by a common filename (other than the extension) and/or by being located in the same directory.

Alternatively, the image data and the metadata can be stored in a single file. For example, the JSON data structure can be included in an ancillary tag according to the exchangeable image file format (EXIF), or it can be appended to the end of the image file. Alternatively, a file format can be defined to include both image data and metadata.

Example of JSON Specification

The following is an example of a JSON specification for picture files according to one embodiment. One skilled in the art will recognize that this example is intended to be illustrative only, and that many other variables, formats, arrangements, and syntaxes can be used without departing from the essential characteristics of the present invention, as defined in the claims.

```
MASTER_OBJ : :=
   {   "version" :
      {
         "major" : INT, "minor" : INT "provisionalDate" : STRING,
      },
      "thumbnailArray : [ THUMBNAIL_OBJ
      "picture" :
      {
         "derivationArray" : [ PICTURE_ID ],
         "frameArray" : [ FRAME_OBJ ],
         "viewArray" : [ VIEW_OBJ ],
         "accelerationArray" : [ ACCELERATION_OBJ ]
      }   }
THUMBNAIL_OBJ : :=
   { "imageRef" : BLOBREF,
      "imageUrl" : URL,
      "image" : INLINE_IMAGE_OBJ,
      "representation" : IMAGE_REPRESENTATION_ENUM,
      "width" : PIXEL,
      "height" : PIXEL   }
INLINE_IMAGE_OBJ : := BASE64_IMAGE_OBJ | ARRAY_IMAGE_OBJ
BASE64_IMAGE_OBJ : :=
   {    // base-64 encoding of a standard format, such as JSON    }
ARRAY_IMAGE_OBJ : :=
   {   "pixelFormat" : "rgb" | "depth",
      "values" : [ ARRAY_IMAGE_PIXEL ]   }
ARRAY_IMAGE_PIXEL : := NUMBER | [ NUMBER ]
IMAGE_REPRESENTATION_ENUM : :=
   "jpeg" | "array"
PICTURE_ID : := STRING
FRAME_OBJ : :=
   {   "frame" :
      {
         "imageRef" : BLOBREF,
         "image" : INLINE_IMAGE_OBJ,
         "metadataRef" : BLOBREF,
         "metadata" : FRAME_METADATA_OBJ,
         "privateMetadataRef" : BLOBREF,
         "privateMetadata" : PRIVATE_FRAME_METADATA_OBJ,
      },
      "parameters" : FRAME_PARAMETER_OBJ,
      "accelerationArray" : [ ACCELERATION_OBJ ]   }
FRAME_METADATA_OBJ : :=
   {
      "type" : "2d" | "lightField",
      "camera" :
      { "make" : STRING,
         "model" : STRING,
         "firmware" : STRING   }
      "modes" :
      { "autoRotate" : BOOLEAN,
         "defaultCameraTurns" : TURN,
         "selectedCameraTurns" : TURN,   }
      "image" :
      {
         "width" : PIXEL,
         "height" : PIXEL
         "representation" : FRAME_IMAGE_REPRESENTATION_ENUM,
         "rawDetails" :
         {
            "mosaic" : //    pattern of pixels in the raw image
            {
```

```
            "tile" : SENSOR_TILE_ENUM,      // name of tile pattern
            "upperLeftPixel" : SENSOR_TILE_PIXEL_ENUM,       // name of
pixel in tile pattern that is upper left in the image
            }
         "cropFromSensor" :
            {
            "left" : INT,                                    // number of
columns of pixels removed from the left side of the sensor image
            "right" : INT,                                   // number of
columns of pixels removed from the right side of the sensor image
            "top" : INT,                                     // number of
rows of pixels removed from the top of the sensor image
            "bottom" : INT                                   // number of
rows of pixels removed from the bottom of the sensor image
            },
         "pixelPacking" :                                    // how
individual pixels are packed into the raw data (see discussion below)
            {
            "endianness" : "little" | "big", // data are a byte
stream. Little endian means LSBs come before MSBs. Big means opposite.
            "bitsPerPixel" : BIT                             // bits per
pixel in the raw stream. Greater than or equal to sensor bitsPerPixel.
            },
         "pixelFormat" :     // how to interpret the value of an
individual pixel (after it is unpacked from the raw data)
            { "rightShift" : BIT,                            // shift
required to right-justify the valid bitsPerPixel (may not be negative)
            "black" : INT,                                   // post-
shift black value (values below this are negative values, due to noise)
            "white" : INT,                                   // post-
shift white value (values above this are special reserved values)
            "defect" : INT    // Post-shift value for defective pixels
            }
         },
         "color" :
         { "mode" : "bakedIntoFrame" | "recommended",
            "whiteBalanceGain" :                                       {
            "r" : NUMBER,
            "g" : NUMBER,
            "b" : NUMBER    },
            "ccmRgbToSrgbArray : [ NUMBER ],    // optional if
"recommended", 3×3 array,row major, premultiplies color vector (r,g,b)T
            "cctKelvin" : NUMBER,
            "gamma" : NUMBER
         }
      }
      "devices"
      {
         "accelerometer" :
         { "make" : STRING,
            "model" : STRING,
            "firmware" : STRING,
            "sampleArray" : [ ACCELEROMETER_SAMPLE_OBJ ]      },
         "clock"
         { "make" : STRING,
            "model" : STRING,
            "firmware" : STRING,
            "zuluTime" : STRING
            "localTime" : STRING          },
         "gps" :
         { "make" : STRING,
            "model" : STRING,
            "firmware" : STRING                }, 
         "flashArray" : [ FLASH_OBJ ],
         "lens" :
         { "make" : STRING,
            "model" : STRING,
            "firmware" : STRING,
            "temperature" : CELSIUS,
            "focalLength" : METER,
            "focusDistance" : METER,                         // object-
coordinate focus distance of the lens to the MLA
            "macro" : BOOLEAN,    // true if in macro mode
(focusDistance is less than its usual function of focalLength)
            "infinityLambda" : LAMBDA,                       // distance
ahead of the MLA that is in focus at infinity (along optical axis)
            "zoomStep" : INT, // zoom stepper-motor position
            "focusStep" : INT, // focus stepper-motor position
            "entranceFNumber" : NUMBER,                      // ratio of
```

```
focal length to the diameter of the entrance pupil (traditional f-number)
            "exitFNumber" : NUMBER,                          // ratio of
focal length to the diameter of the exit pupil
            "exitPupilOffset" :
            { "x" : METER, "y" : METER, "z" : METER     }
        },
        "mla" :
        {
            "make" : STRING,
            "model" : STRING,
            "tiling" : MLA_PACKING_ENUM,
            "rotation" : RADIAN,           // positive values indicate
CW rotation, viewed from the optical axis in front of the camera
            "lensPitch" : METER,
            "focalLength" : METER,
            "scaleFactor" :
            { "x" : NUMBER,
                "y" :NUMBER       },
            "sensorOffset" :
            { "x" :METER,
                "y" :METER,
                "z" :METER        },
            "defectArray" : [ MLA_DEFECT_OBJ ]
        }
        "ndfilter" :
        {
            "make" : STRING,
            "model" : STRING,
            "stops" : NUMBER    // effective light blockage for this frame
        },
        "sensor" :
        {
            "make" : STRING,
            "model" : STRING,
            "firmware" : STRING,
            "iso" : INT,
            "analogGain" :
            { "r" : NUMBER,
                "gr" : NUMBER,
                "gb" : NUMBER,
                "b" : NUMBER      },
            "digitalGain" :
            { "r" :NUMBER,
                "gr" : NUMBER,
                "gb" : NUMBER,
                "b" : NUMBER      },
            "mosaic" :
            {
                "tile" : SENSOR_TILE ENUM,               // name of
tile pattern
                "upperLeftPixel" : SENSOR_TILE_PIXEL_ENUM,   // name of
pixel in tile pattern that is upper left
            },
            "bitsPerPixel" : BIT,
            "pixelPitch" : METER
        },
        "shutter" :
        {
            "make" : STRING,
            "model" : STRING,
            "mechanism" : SHUTTER_MECHANISM_ENUM,
            "pixelExposureDuration" : SECOND,              //
approximate exposure time of an individual pixel
            "frameExposureDuration" : SECOND               //
approximate exposure time from start of first-pixel exposure to end of
last-pixel exposure
        }
        "soc" :
        {
            "make" : STRING,
            "model" : STRING,
            "firmware" : STRING,
            "temperature" : CELSIUS
        }     } }
FRAME_IMAGE_REPRESENTATION_ENUM : :=
    "jpeg" | "jpegRaw" | "dng" | "raw"
FLASH_OBJ : :=
{ "make" : STRING,
    "model" : STRING,
```

```
        "firmware" : STRING,
        "brightness" : NUMBER,
        "duration" : SECOND }
    ACCELEROMETER_SAMPLE_OBJ : :=
        {   "x" : G,                                    //
acceleration in the camera's positive x direction (right)
        "y" : G,                                        //
acceleration in the camera's positive y direction (up)
        "z" : G,                                        //
acceleration in the camera's positive z direction (backward)
        "time" : SECOND                                 // measured
from clock value (negative before, positive after)   }
    SHUTTER MECHANISM_ENUM : :=
        "sensorRolling" |
        "sensorOpenApertureClose |
        "apertureOpenClose"
    SENSOR_TILE_ENUM : := "r, gr : gb, b"
    SENSOR_TILE_PIXEL_ENUM : := "r" | "gr" | "gb" | "b"
    MLA_PACKING_ENUM : :=
        "squareUniform" |
        "hexUniformRowMajor" |
        "hexUniformColumnMajor"
    MLA_DEFECT_OBJ : :=
        { "x" : MLA_COORD,                              // increases left-to-right
          "y": MLA_COORD,                               // increases
top-to-bottom in square grid, 60 degrees down and to the right in hex grid
          "type" : MLA_DEFECT_TYPE_ENUM,       }
    PRIVATE_FRAME_METADATA_OBJ : :=
        { "derivationArray" : [ FRAME_REF_OBJ ],
          "camera" :
          {   "serialNumber" : STRING        },
          "devices" :
          {
            "gps"
            { "latitudeDeg" : DEGREES, "longitudeDeg" : DEGREES        }
          } }
    FRAME_REF_OBJ : :=
        {   "imageRef" : BLOBREF,
            "metadataRef" : BLOBREF,
            "privateMetadataRef" : BLOBREF,
            "description": STRING              }
    FRAME_PARAMETER_OBJ : :=
        {  "vendorContent" : VENDOR_FRAME_PARAMETER_OBJ    }
    VIEW_OBJ : :=
        {   "vendorContent": VENDOR_VIEW_OBJ    }
    ACCELERATION_OBJ : :=
        {   "type" : VENDOR_STRING,                     //
Uniquely identifies the type of this acceleration object
            "generator" : VENDOR_STRING,                // software
system used to compute acceleration data (e.g., images)
            "keep" : BOOLEAN, // presumed false if not present
            "vendorContent" : VENDOR_ACCELERATION_OBJ    }
```

In various embodiments, any number of extensions can be made to the JSON specification for picture files; these may be provided, for example, for certain types of equipment or vendors according to one embodiment.

Binary Large Object (BLOB) Storage

In one embodiment, frame and/or picture data is stored as binary large objects (BLOBs). "Blobrefs" can be used as wrappers for such BLOBs; each blobref holds or refers to a BLOB. As described above, blobrefs can contain hash type and hash data, so as to facilitate authentication of data stored in BLOBs.

Figure 8:
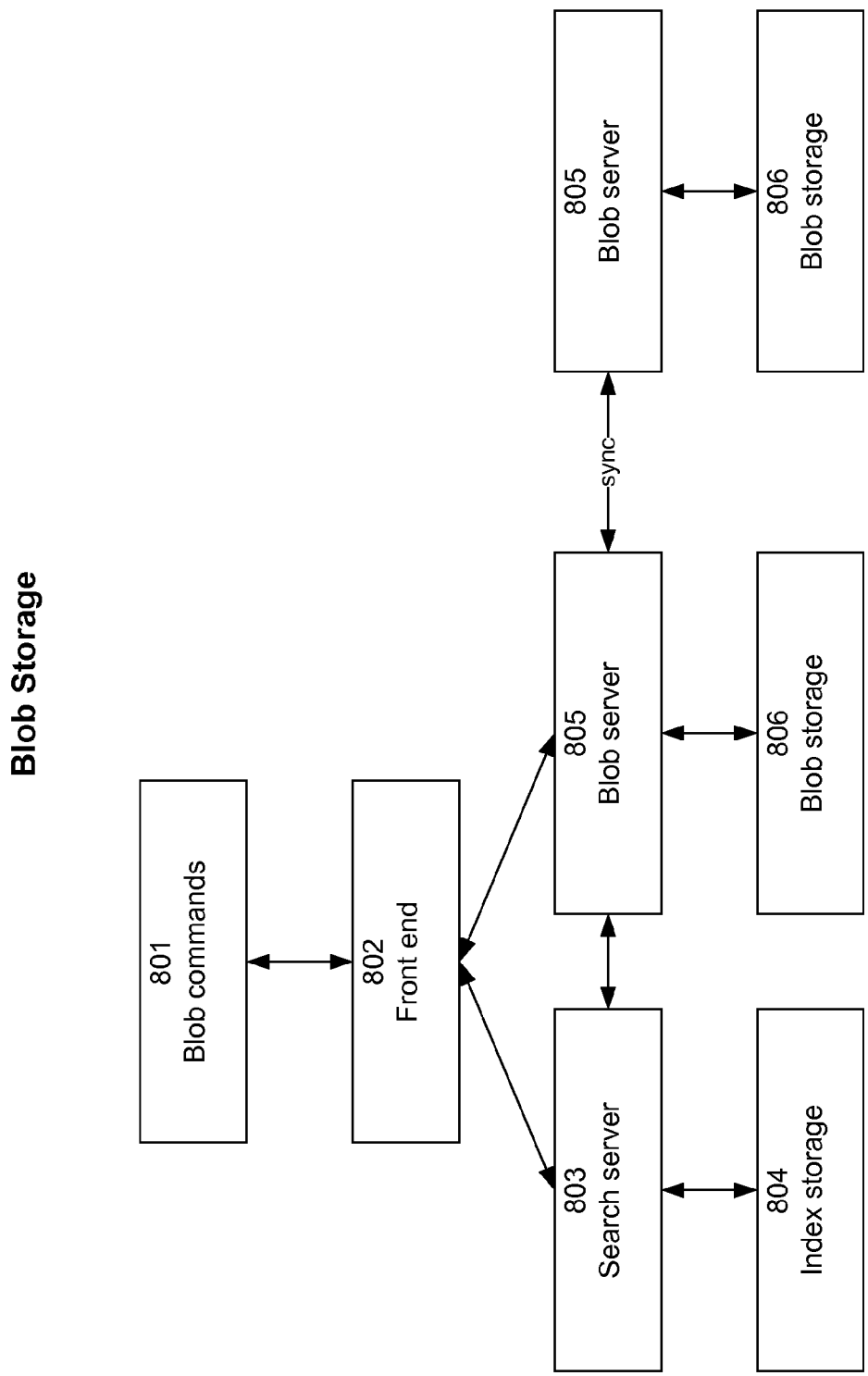
FIG. 8 depicts an example of a mechanism for BLOB storage according to one embodiment.

Referring now to FIG. 8, there is shown an example of a mechanism for BLOB storage according to one embodiment. Front end 802 receives commands 801 such as put (blobref, blob) and get(blobref) (which returns a BLOB). Front end 802 may be an application programming interface (API), for example, for receiving commands 801 from a browser, input device, or other source. Upon receiving a request to retrieve a BLOB, front end 802 may pass a search request to search server 803, which obtains index data from index storage 804 so as to identify the location of the requested BLOB. Front end 802 makes requests of the appropriate blob server(s) 505, based on the index data, to obtain the requested BLOB. Blob servers 805 retrieve requested BLOBs from blob storage 806.

In one embodiment, Blob servers 805 communicate with one another to keep their data in sync, so as to avoid discrepancies in stored BLOBs. In addition, search server 803 may periodically communicate with one or more Blob servers 805 in order to update its index 804.

Method

Figure 9:
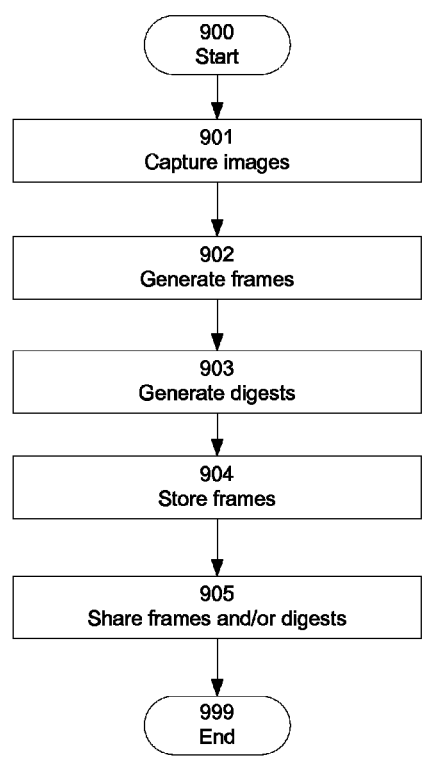
FIG. 9 is a flowchart depicting a method of generating and sharing frames and/or digests, according to one embodiment.

Referring now to FIG. 9, there is shown a flowchart depicting a method of generating and sharing frames 202 and/or digests 402, according to one embodiment. Camera 100 or other data acquisition device captures 901 images and generates 902 frames 202 from the captured images. As described above frames 202 can contain metadata describing the equipment used in capturing the image, as well as removable identifying information and the like. Digests 402 are generated 903 by applying a hash function to frame data, as described above. Frames 202 are stored 903, either at camera 100 or at some central location such as server 109, another camera 100, computing device 105, or the like. Digests 402 and/or frames 202 are shared 905 among devices, if appropriate, to allow images captured in step 901 to be combined with images captured at other devices. As described above, in some embodiments digests 402 are shared so as to conserve bandwidth. Sharing 905 of frames 202 and/or digests 402 can include transmission over a computing network, as described above.

Figure 10:
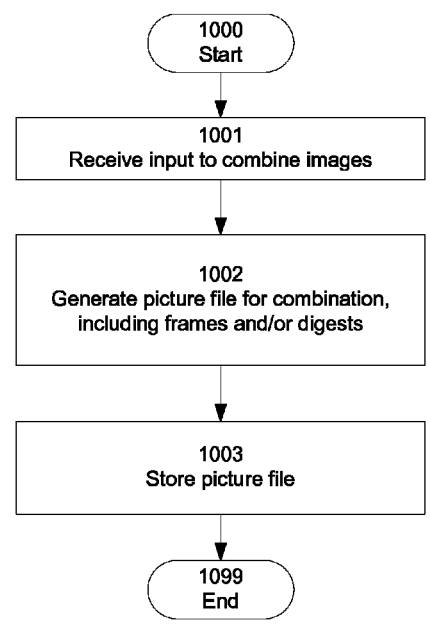
FIG. 10 is a flowchart depicting a method of generating and storing a picture file specifying a combination of frames, according to one embodiment.

Referring now to FIG. 10, there is shown a flowchart depicting a method of generating and storing a picture 201 file specifying a combination of frames 202, according to one embodiment. In one embodiment, such an operation is performed in response to receiving input 1001, for example a command entered via input device 108, to combine images. Alternatively, such an operation can be performed automatically in response to a determination that two or more images are related (for example if it is determined that they are of the same subject at approximately the same time). Picture 201 file is generated 1002, which can include any combination of frames 202 and/or digests 402. As specified above, picture 201 may include instructions for combining frames 202. Picture 201 file is stored 1003, for example in data storage 104 at a camera 100, computing device 105, server 109, or any other suitable location.

Once a picture 201 file has been generated and stored, a final image 107 can be generated from picture 201, using the image data and instructions contained therein. Such rendering can happen at any time, even long after picture 201 file has been generated.

Figure 11:
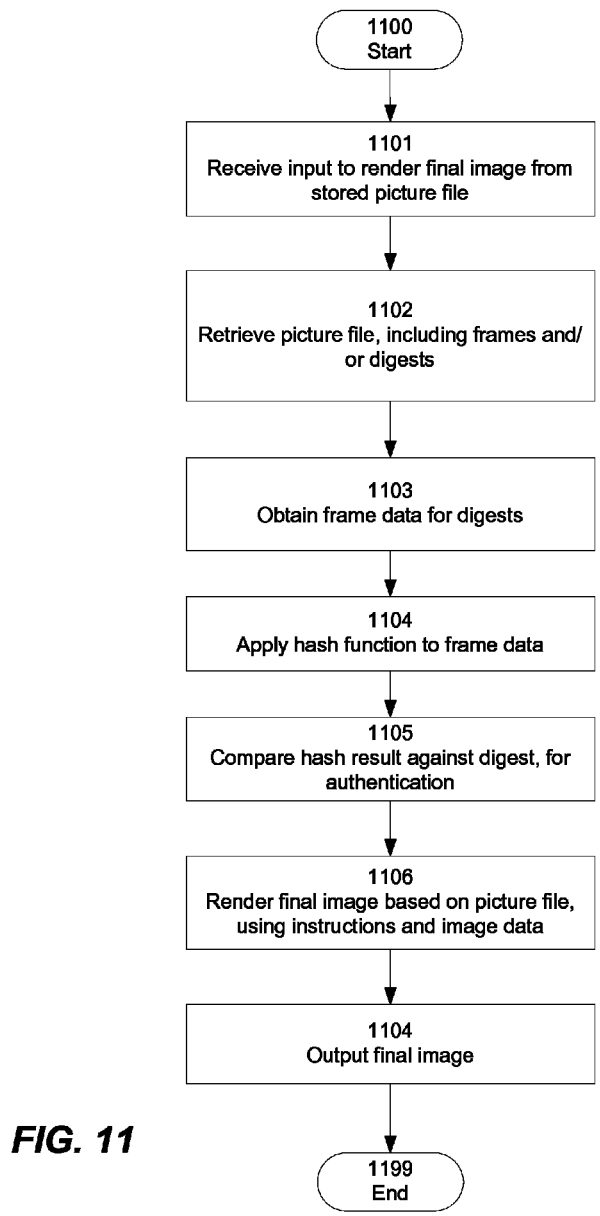
FIG. 11 is a flowchart depicting a method of rendering and outputting a final image based on a stored picture file, according to one embodiment.

Referring now to FIG. 11, there is shown a flowchart depicting a method of rendering and outputting a final image based on a stored picture 201 file, according to one embodiment. In one embodiment, such an operation is performed in response to receiving 1101 input, for example via input device 108, to render a final image 107. In one embodiment, the steps of FIG. 10 are performed by image renderer 502 in response to such input.

Picture file 1102 is retrieved. If picture 201 includes frames 202, the frames are retrieved for rendering. If picture 201 includes digests 402, the corresponding frames 202 are retrieved 1103, and can be authenticated by independent application 1104 of the hash function to frame 202 data, as described above. The hash result from such independent application is compared 1105 against stored digest 402 for authentication. If the retrieved frames 202 are authenticated, final image 107 is rendered 1106 based on data in picture file 201, including image data and/or instructions. Once final image 107 has been rendered, it is output 1104, for example on output device 106 such as a display screen.

In one embodiment, user input is received for controlling the rendering operation 1106. For example, user 110 may be able to control various parameters of the image combination, such as size, contrast, distortion, and the like. Any type of suitable user interface may be provided for enabling such user control.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A system for generating an image from a plurality of component elements captured by different image capture devices, the system comprising:
a plurality of image capture devices, each image capture device comprising:
an image capture mechanism, configured to:
capture at least one image;
acquire metadata associated with the captured at least one image; and
generate at least one frame, each frame comprising a captured image and metadata associated with the captured image;
a hash module, configured to apply a hash function to generate at least one digest from the captured image and metadata in at least one frame;
a storage device, communicatively coupled to the image capture mechanism and to the hash module, configured to store the at least one frame and the at least one digest; and
a communications interface, configured to transmit the at least one digest to at least one other device;
an image renderer, configured to render a viewable image from a plurality of frames by:
receiving a plurality of digests from image capture devices, each digest identifying a corresponding frame;
obtaining frames corresponding to the received digests, each obtained frame comprising an image and metadata associated with the image;
authenticating at least one of the obtained frames by applying a hash module to the image and metadata in the obtained frame and comparing the result with the corresponding received digest; and
combining the plurality of obtained frames to generate a viewable image; and
an output device, communicatively coupled to the image renderer, for outputting the viewable image.

2. The system of claim 1, wherein the image renderer is associated with a server, and wherein obtaining frames corresponding to the received digests comprises obtaining the frames at the server.

3. The system of claim 1, wherein the image renderer is associated with an image capture device, and wherein obtaining frames corresponding to the received comprises obtaining the frames at the image capture device associated with the image renderer.

4. The system of claim 1, wherein the image capture device is configured to transmit at least one generated frame to a server responsive to a trigger event.

5. The system of claim 4, wherein the trigger event comprises availability of sufficient bandwidth to transmit at least one generated frame.

6. The system of claim 1, wherein each image capture device comprises a camera.

7. The system of claim 1, wherein:
the image renderer combines the plurality of obtained frames using at least a subset of the metadata in the obtained frames.

8. The system of claim 1, wherein the communications interface is configured to transmit the at least one digest to at least one other device via an electronic network.

9. The system of claim 1, wherein the image renderer is configured to obtain the frames via an electronic network.

10. The system of claim 1, wherein the storage device is configured to store a container file associated with a plurality of frames, each frame comprising:
a captured image; and
metadata associated with the captured image;
wherein the container file is further associated with instructions for combining the frames with one another;

and wherein the image renderer is further configured to perform at least one operation on at least a subset of the frames according to the instructions.

11. The system of claim 1, wherein at least one of the image capture devices comprises a camera.

12. The system of claim 1, wherein at least one of the captured images comprises a light field image.

13. The system of claim 1, wherein the metadata comprises a plurality of name-value pairs.

14. The system of claim 1, wherein the metadata is represented using JavaScript Object Notation.

15. The system of claim 1, wherein the metadata comprises at least one selected from the group consisting of:
    a description of equipment used to capture the captured image;
    a description of settings used when capturing the captured image;
    a location associated with the captured image;
    at least one parameter associated with the image data; and
    light field data associated with the image data.

16. The system of claim 1, wherein the metadata comprises at least one removable metadata section.

17. A method for generating an image from a plurality of component elements captured by different image capture devices, the method comprising:
    at a first device in a plurality of image capture devices:
        capturing at least one image;
        acquiring metadata associated with the captured at least one image; and
        generating at least one frame, each frame comprising a captured image and metadata associated with the captured image;
    storing the at least one frame;
    receiving at least one digest from at least one second device, each digest having been generated by application of a hash function to a frame comprising a captured image and metadata associated with the captured image, each digest identifying a corresponding frame;
    subsequently obtaining at least one frame corresponding to the at least one received digest, each obtained frame comprising an image and metadata associated with the image;
    authenticating the obtained frame by applying a hash module to the image and metadata in the obtained frame and comparing the result with the corresponding received digest;
    combining the obtained frame with at least one frame generated at the first device, to generate a viewable image; and
    outputting the viewable image.

18. The method of claim 17, wherein obtaining at least one frame comprises obtaining the at least one frame from a server.

19. The method of claim 17, further comprising:
    applying a hash function to generate at least one digest from the captured image and metadata in at least one frame; and
    transmitting the generated digest to at least a second device in the plurality of image capture devices.

20. The method of claim 17, further comprising transmitting at least one generated frame to a server.

21. The method of claim 17, further comprising transmitting at least one generated frame to a server responsive to a trigger event.

22. The method of claim 21, wherein the trigger event comprises availability of sufficient bandwidth to transmit at least one generated frame.

23. The method of claim 17, wherein:
    combining the obtained frame with at least one frame generated at the first device comprises combining the obtained frame with the at least one frame generated at the first device using at least a subset of the metadata in the obtained frame and using at least a subset of the data in the frame generated at the first device.

24. A computer program product for generating an image from a plurality of component elements captured by different image capture devices, the computer program product comprising:
    a nontransitory computer-readable storage medium; and
    computer program code, encoded on the medium, configured to cause at least one processor at a first device to perform the steps of:
        capturing at least one image;
        acquiring metadata associated with the captured at least one image;
        generating at least one frame, each frame comprising a captured image and metadata associated with the captured image;
        causing a storage device to store the at least one frame;
        receiving at least one digest from at least one second device, each digest having been generated by application of a hash function to a frame comprising a captured image and metadata associated with the captured image, each digest identifying a corresponding frame;
        subsequently obtaining at least one frame corresponding to the at least one received digest, each obtained frame comprising an image and metadata associated with the image;
        authenticating the obtained frame by applying a hash module to the image and metadata in the obtained frame and comparing the result with the corresponding received digest;
        combining the obtained frame with at least one frame generated at the first device, to generate a viewable image; and
        causing an output device to output the viewable image.

25. The computer program product of claim 24, wherein the computer program code configured to cause at least one processor to obtain at least one frame comprises computer program code configured to cause at least one processor to obtain the at least one frame from a server.

26. The computer program product of claim 24, further comprising computer program code configured to cause at least one processor to perform the steps of:
    applying a hash function to generate at least one digest from the captured image and metadata in at least one frame; and
    transmitting the generated digest to at least a second device.

27. The computer program product of claim 26, further comprising computer program code configured to cause at least one processor to transmit at least one generated frame to a server.

28. The computer program product of claim 24, wherein the computer program code configured to cause at least one processor to combine the obtained frame with at least one frame generated at the first device comprises computer program code configured to cause at least one processor to
combine the obtained frame with the at least one frame generated at the first device using at least a subset of the metadata in the obtained frame and using at least a subset of the data in the frame generated at the first device.

* * * * *